United States Patent
Song et al.

(10) Patent No.: US 10,972,975 B2
(45) Date of Patent: Apr. 6, 2021

(54) ELECTRONIC DEVICE FOR TRANSMITTING COMMUNICATION SIGNAL RELATED TO PEDESTRIAN SAFETY AND METHOD OF OPERATING SAME

(71) Applicant: Samsung Electronics Co., Ltd., Suwon-si (KR)

(72) Inventors: Ga-Jin Song, Anyang-si (KR); A-Reum Choi, Suwon-si (KR); Dong-Il Son, Hwaseong-si (KR); Je-Hyun Lee, Seoul (KR); Sun-Min Hwang, Hwaseong-si (KR); In-Young Choi, Seoul (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 16/047,591

(22) Filed: Jul. 27, 2018

(65) Prior Publication Data
US 2019/0053154 A1 Feb. 14, 2019

(30) Foreign Application Priority Data
Aug. 10, 2017 (KR) .......................... 10-2017-0101576

(51) Int. Cl.
*H04W 52/02* (2009.01)
*H04W 4/48* (2018.01)
(Continued)

(52) U.S. Cl.
CPC ........ *H04W 52/0216* (2013.01); *G08G 1/005* (2013.01); *G08G 1/163* (2013.01);
(Continued)

(58) Field of Classification Search
CPC ..... H04W 52/0216; H04W 4/44; H04W 4/90; H04W 4/40; H04W 4/021; H04W 4/48;
(Continued)

(56) References Cited

U.S. PATENT DOCUMENTS

| 2011/0133915 A1 | 6/2011 | Ito |
| 2011/0133954 A1 | 6/2011 | Ooshima et al. |

(Continued)

FOREIGN PATENT DOCUMENTS

| KR | 10-2017-0015584 A | 12/1980 |
| KR | 10-2014-0121854 A | 10/2014 |

OTHER PUBLICATIONS

Notification of the Reasons for Rejection dated Feb. 1, 2021 in connection with Korean Application No. 10-2017-0101576, 14 pages.
(Continued)

*Primary Examiner* — Vinncelas Louis

(57) ABSTRACT

An electronic device may include: a housing; a display exposed through the housing; a wireless communication circuit located within the housing; a processor located within the housing and operably connected to the display and the wireless communication circuit; and a memory located within the housing and operably connected to the processor, wherein the memory may store instructions to cause the processor, when executed, to switch a plurality of states related to all or one of transmission/reception of both a first signal and a second signal and transmission/reception of one thereof, the first signal includes information generated at least partially based on a state of the electronic device, the second signal includes information generated at least partially based on a state of a vehicle, and the plurality of states includes a first state, a second state, a third state, and a fourth state. Various other embodiments are possible.

20 Claims, 31 Drawing Sheets

(51) Int. Cl.
| | |
|---|---|
| *H04W 4/021* | (2018.01) |
| *H04W 4/40* | (2018.01) |
| *G08G 1/00* | (2006.01) |
| *G08G 1/16* | (2006.01) |
| *H04W 4/90* | (2018.01) |
| *H04W 4/44* | (2018.01) |
| *G08G 1/005* | (2006.01) |
| *H04W 4/46* | (2018.01) |
| *H04B 1/3827* | (2015.01) |
| *H04L 29/08* | (2006.01) |

(52) U.S. Cl.
CPC ............ *G08G 1/164* (2013.01); *G08G 1/205* (2013.01); *H04W 4/021* (2013.01); *H04W 4/40* (2018.02); *H04W 4/44* (2018.02); *H04W 4/48* (2018.02); *H04W 4/90* (2018.02); *G08G 1/162* (2013.01); *H04B 1/3827* (2013.01); *H04L 67/12* (2013.01); *H04W 4/46* (2018.02)

(58) Field of Classification Search
CPC .......... H04W 4/46; H04W 4/16; G08G 1/005; G08G 1/164; G08G 1/163; G08G 1/205; G08G 1/162; H04L 67/12; H04B 1/3827; G07C 5/008
See application file for complete search history.

(56) References Cited

U.S. PATENT DOCUMENTS

| | | | |
|---|---|---|---|
| 2013/0210460 A1 | 8/2013 | Subramanian et al. | |
| 2014/0009275 A1 | 1/2014 | Bowers et al. | |
| 2015/0061851 A1* | 3/2015 | Tomita ................. | G08B 25/006 340/436 |
| 2015/0084757 A1* | 3/2015 | Annibale ................ | H04L 67/12 340/436 |
| 2015/0127570 A1* | 5/2015 | Doughty ................ | G06Q 10/00 705/325 |
| 2015/0245186 A1* | 8/2015 | Park ........................ | H04W 4/16 455/417 |
| 2018/0204394 A1* | 7/2018 | Dahl ...................... | G07C 5/008 |
| 2018/0262865 A1* | 9/2018 | Lepp ...................... | G08G 1/162 |

OTHER PUBLICATIONS

Perry, Frank, "Overview of DSRC Messages and Performance Requirements," UFTI DSRC and Other Communication Options for Transportation Connectivity Workshop, HNTB, May 3, 2017, 34 pages.

* cited by examiner

ELECTRONIC DEVICE FOR TRANSMITTING COMMUNICATION SIGNAL RELATED TO PEDESTRIAN SAFETY AND METHOD OF OPERATING SAME

CROSS-REFERENCE TO RELATED APPLICATIONS AND CLAIM OF PRIORITY

This application is based on and claims priority under 35 U.S.C. § 119 of Korean Patent Application No. 10-2017-0101576 filed on Aug. 10, 2017 in the Korean Intellectual Property Office, the disclosure of which is incorporated herein by reference in its entirety.

BACKGROUND

1. Field

The present disclosure relates to technology for providing information through a wired/wireless network based on a vehicle.

2. Description of Related Art

Recently, technology for performing communication between vehicles such as cars and other entities has been developed. Such a vehicle may include a communication circuit for wireless communication and transmit various pieces of information such as the speed of the vehicle, the direction in which the vehicle is heading, and whether or not a brake operates to another entity through the communication circuit.

Technology for providing information through a wired/wireless network based on a car is called Vehicle-to-Everything (V2X) communication, and includes wireless communication between vehicles (Vehicle to Vehicle: V2V), wireless communication between a vehicle and infrastructure (Vehicle to Infrastructure: V2I), wired/wireless networking within a vehicle (In-Vehicle Networking: IVN), and communication between a vehicle and a pedestrian (Vehicle to Pedestrian: V2P). Such V2X technology may increase the safety and convenience of the surrounding environment by allowing vehicles and various entities to exchange information on nearby roads.

SUMMARY

An electronic device possessed by a pedestrian may transmit activity information (including operation information of a vehicle that the pedestrian boards) of the pedestrian, acquired periodically or aperiodically, to an adjacent vehicle or infrastructure (for example, a roadside BS). The vehicle may include a large-capacity battery therein, and the electronic device possessed by the pedestrian may include a relatively small-capacity battery compared to a roadside BS, which receives power through a wire. When the electronic device possessed by the pedestrian transmits information for safety all the time, the battery of the electronic device may be consumed in a short time, and thus other operations of the corresponding electronic device may be limited. Current standardization or research organizations have set forth message formats (for example, a Personal Safety Message (PSM) format) for information related to pedestrian safety or various use cases. However, the time point at which the electronic device transmits information related to pedestrian safety or the conditions under which the electronic device generates and transmits the information and stops the transmission are unclear. An electronic device and an operation method according to various embodiments of the present disclosure may transmit a communication signal including information related to pedestrian safety when a predetermined condition is satisfied.

In accordance with an aspect of the present disclosure, an electronic device is provided. The electronic device includes: a housing; a display exposed through the housing; a wireless communication circuit located within the housing; a processor located within the housing and connected to the display and the wireless communication circuit to be operable; and a memory located within the housing and connected to the processor to be operable, wherein the memory stores instructions to cause the processor, when executed, to switch a plurality of states related to all or one of transmission/reception of both a first signal and a second signal and transmission/reception of one thereof, the first signal includes information generated at least partially based on a state of the electronic device, the second signal includes information generated at least partially based on a state of a vehicle, and the plurality of states includes a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

In accordance with another aspect of the present disclosure, a method of operating an electronic device is provided. The method includes: detecting a trigger of switching a plurality of states related to all or one of transmission/reception of both a first signal and a second signal and transmission/reception of one thereof based on transmission/reception of at least one of the first signal or the second signal or reception of state information of a vehicle; and switching between the plurality of states based at least partially on the detected trigger, wherein the first signal includes information generated at least partially based on a state of the electronic device, the second signal includes information generated at least partially based on a state of the vehicle, and the plurality of states includes a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

In accordance with another aspect of the present disclosure, an electronic device is provided. The electronic device includes: a housing; a display exposed through the housing; a wireless communication circuit located within the housing; a processor located within the housing and connected to the display and the wireless communication circuit to be operable; and a memory located within the housing and connected to the processor to be operable, wherein the memory stores instructions to cause the processor, when executed, to identify an accident of a vehicle after identifying that the electronic device is located inside the vehicle, identify whether location information of the electronic device corresponds to a dangerous area stored in the memory, and when the location information of the electronic device corresponding to the dangerous area and the accident of the vehicle are identified, transmit a communication signal including at least one piece of information related to the accident, location information of the electronic device, or information related to movement of the electronic device to another vehicle or an external electronic device through the communication circuit.

According to various embodiments of the present disclosure, when a predetermined condition is satisfied, an electronic device and an operation method for transmitting a communication signal including information related to pedestrian safety according to the condition can be provided. Accordingly, it is possible to reduce consumption of power of a battery of the electronic device and rapidly transmit safety information for protecting the pedestrian to another vehicle in an area determined to be a dangerous area.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
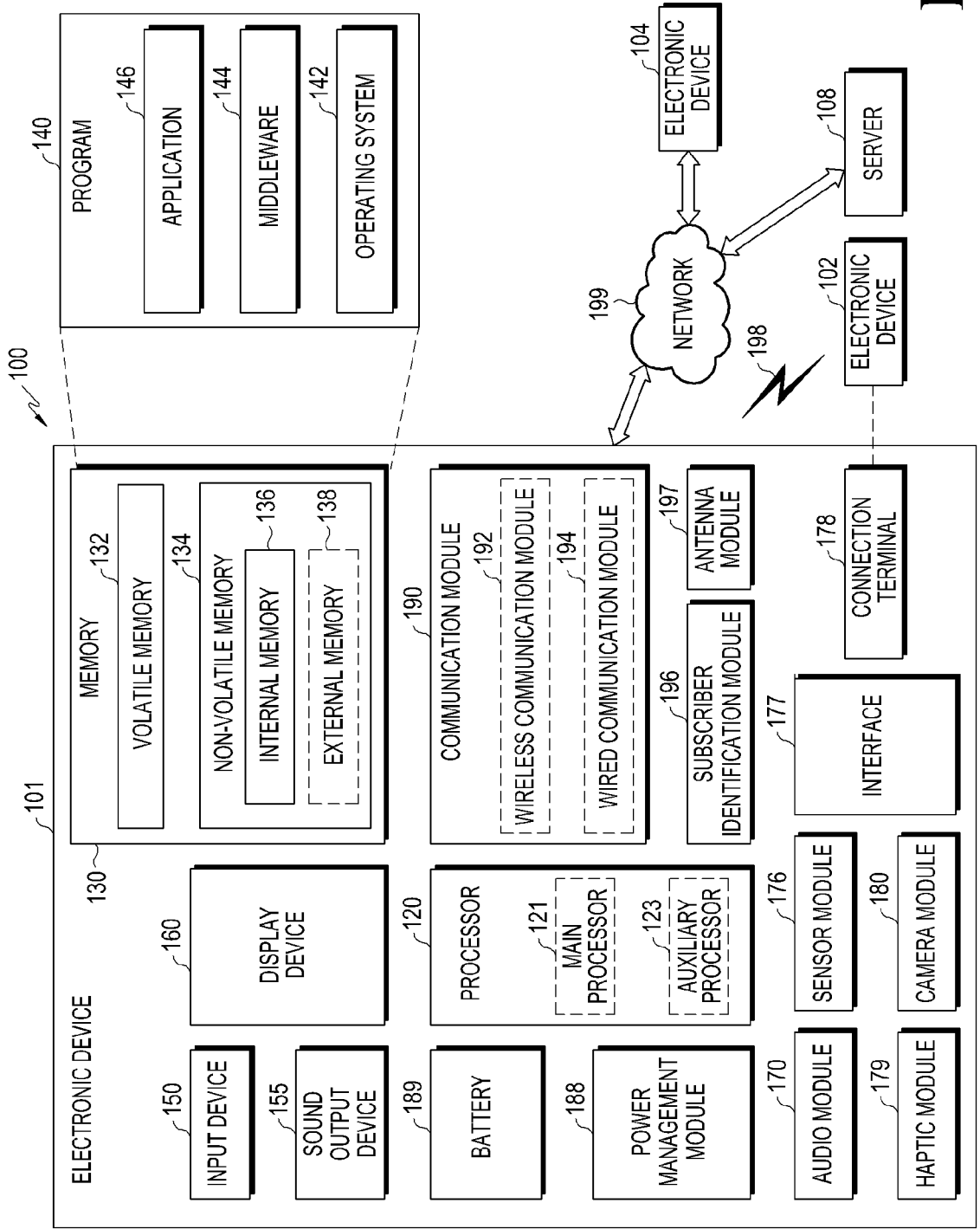
FIG. 1 is a block diagram illustrating an electronic device with a network environment according to various embodiments.

FIG. 1 is a block diagram illustrating an electronic device 101 within a network environment 100 according to various embodiments. Referring to FIG. 1, the electronic device 101 may communicate with an electronic device 102 through a first network 198 (for example, short-range wireless communication) or communicate with an electronic device 104 or a server 108 through a second network 199 (for example, long-distance wireless communication) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of the elements (for example, the display device 160 or the camera module 180) may be omitted from or added to the electronic device 101. In some embodiments, for example, like the sensor module 176 (for example, a fingerprint sensor, an iris sensor, or an illumination sensor) embedded into the display device 160 (for example, a display), some elements may be integrated.

The processor 120 may control at least one other element (for example, hardware or software element) of the electronic device 101 connected to the processor 120 by driving software (for example, the program 140) and perform various data processing and calculations. The processor 120 may load a command or data received from another element (for example, the sensor module 176 or the communication module 190) to the volatile memory 132, process the loaded command or data, and store resultant data in the non-volatile memory 134. According to an embodiment, the processor 120 may include a main processor 121 (for example, a central processing unit or an application processor) and an auxiliary processor 123 (for example, a graphic processing unit, an image signal processor, a sensor hub processor, or a communication processor) operating independently from the main processor 121 and additionally or substantially using lower power than the main processor 121 or specified for a predetermined function. The auxiliary processor 123 may operate separately from the main processor 121 or in the state of being embedded in the main processor 121.

In this case, for example, the auxiliary processor 123 may control at least some of the functions or states associated with at least one element (for example, the display device 160, the sensor module 176, or the communication module 190) among the elements of the electronic device 101, instead of the main processor 121, while the main processor 121 is in an inactive (for example, sleep) state or together with the main processor 121 while the main processor 121 is in an active (for example, application execution) state. According to an embodiment, the auxiliary processor 123 (for example, an image signal processor or a communication processor) may be implemented as a partial element of other functionally relevant elements (for example, the camera module 180 or the communication module 190). The memory 130 may store various pieces of data used by at least one element (for example, the processor 120 or the sensor module 176), for example, software (for example, the program 140) and input data or output data on commands related to the software. The memory 130 may include volatile memory 132 or non-volatile memory 134.

The program 140 is software stored in the memory 130, and may include, for example, an operating system 142, middleware 144, or an application 146.

The input device 150 is a device for receiving a command or data to be used for the element (for example, the processor 120) of the electronic device 101 from the outside (for example, the user), and may include, for example, a microphone, a mouse, or a keyboard.

The sound output device 155 is a device for outputting a sound signal to the outside of the electronic device 101, and may include, for example, a speaker used for general purposes, such as playing multimedia or recording, and a receiver dedicated to receiving calls. According to an embodiment, the receiver may be formed integratedly with or separately from the speaker.

The display device 160 is a device for providing visual information to the user of the electronic device 101, and may include, for example, a display, a hologram device, or a control circuit for controlling a projector and a corresponding device. According to an embodiment, the display device 160 may include a touch circuitry or a pressure sensor for measuring the intensity of pressure of a touch.

The audio module 170 may bilaterally convert a sound and an electronic signal. According to an embodiment, the audio module 170 may acquire a sound through the input device 150 or output a sound through the sound output device 155 or an external electronic device (for example, the electronic device 102 (for example, a speaker or headphones) connected to the electronic device 101 wirelessly or through a wire.

The sensor module 176 may generate an electric signal or a data value corresponding to an internal operation state (for example, power or temperature) or an external environment state of the electronic device 101. The sensor module 176 may include, for example, a gesture sensor, a gyro sensor, an atmospheric pressure sensor, a magnetic field sensor, an acceleration sensor, a grip sensor, a proximity sensor, a color sensor, an InfraRed (IR) sensor, a biometric sensor, a temperature sensor, a humidity sensor, or an illumination sensor.

The interface 177 may support a predetermined protocol which can enable connection to an external electronic device (for example, the electronic device 102) wirelessly or through a wire. According to an embodiment, the interface 177 may include a High-Definition Multimedia Interface (HDMI), a Universal Serial Bus (USB) interface, an SD card interface, or an audio interface.

The connection terminal 178 may include a connector, which can physically connect the electronic device 101 and an external electronic device (for example, the electronic device 102), for example, an HDMI connector, a USB connector, an SD card connector, or an audio connector (for example, a headphone connector).

The haptic module 179 may convert an electric signal into mechanical stimulation (for example, vibration or motion) or electric stimulation, which the user recognizes through a sense of touch or kinesthesia. The haptic module 179 may include, for example, a motor, a piezoelectric element, or an electrostimulator.

The camera module 180 may photograph a still image and a dynamic image. According to an embodiment, the camera module 180 may include one or more lenses, an image sensor, an image signal processor, or a flash.

The power management module 188 is a module for managing power supplied to the electronic device 101, and may be configured as at least part of a Power Management Integrated Circuit (PMIC).

The battery 189 is a device for supplying power to at least one element of the electronic device 101, and may include, for example, a primary cell, which is not rechargeable, a secondary cell, which is rechargeable, or a fuel cell.

The communication module 190 may support establishment of a wired or wireless communication channel between the electronic device 101 and an external electronic device (for example, the electronic device 102, the electronic device 104, or the server 108) or communication through the established communication channel. The communication module 190 may include one or more communication processors for supporting wired communication or wireless communication, operating independently from the processor 120 (for example, an application processor). According to an embodiment, the communication module 190 may include a wireless communication module 192 (for example, a cellular communication module, a short-range wireless communication module, or a Global Navigation Satellite System (GNSS) communication module) or a wired communication module 194 (for example, a Local Area Network (LAN) communication module or a power-line communication module), and may communicate with an external electronic device through a first network 198 (for example, a short-range communication network such as Bluetooth, Wi-Fi direct, or Infrared Data Association (IrDA)) or a second network 199 (for example, a long-distance communication network such as a cellular network, Internet, or a computer network (for example, a LAN or a WAN)) using one of the communication modules. The various types of communication modules 190 may be implemented by a single chip or separate chips.

According to an embodiment, the wireless communication module 192 may identify and authenticate the electronic device 101 within the communication network using user information stored in the subscriber identification module 196.

The antenna module 197 may include one or more antennas for transmitting a signal or power to the outside or receiving a signal or power from the outside. According to an embodiment, the communication module 190 (for example, the wireless communication module 192) may transmit a signal to an external electronic device or receive a signal from an external electronic device through an antenna suitable for a communication scheme.

Some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, commands of data) therebetween.

According to an embodiment, a command or data may be transmitted or received between the electronic device 101 and the external electronic device 104 through the server 108 connected to the second network 199. Each of the electronic devices 102 and 104 may be a device which is the same type as or a different type from that of the electronic device 101. According to an embodiment, all or some of the operations executed by the electronic device 101 may be executed by another or a plurality of external electronic devices. According to an embodiment, when the electronic device 101 performs any function or service automatically or by a request, the electronic device 101 may make a request for at least some functions related to the function or service to an external electronic device instead of or additionally executing the function or service by itself. The external electronic device receiving the request may execute a requested function or an additional function and transmit the result thereof to the electronic device 101. The electronic device 101 may provide the received result as it is, or may additionally process the received result to provide the requested functions or services. To this end, for example, cloud-computing, distributed-computing, or client-server-computing technology may be used.

Figure 2:
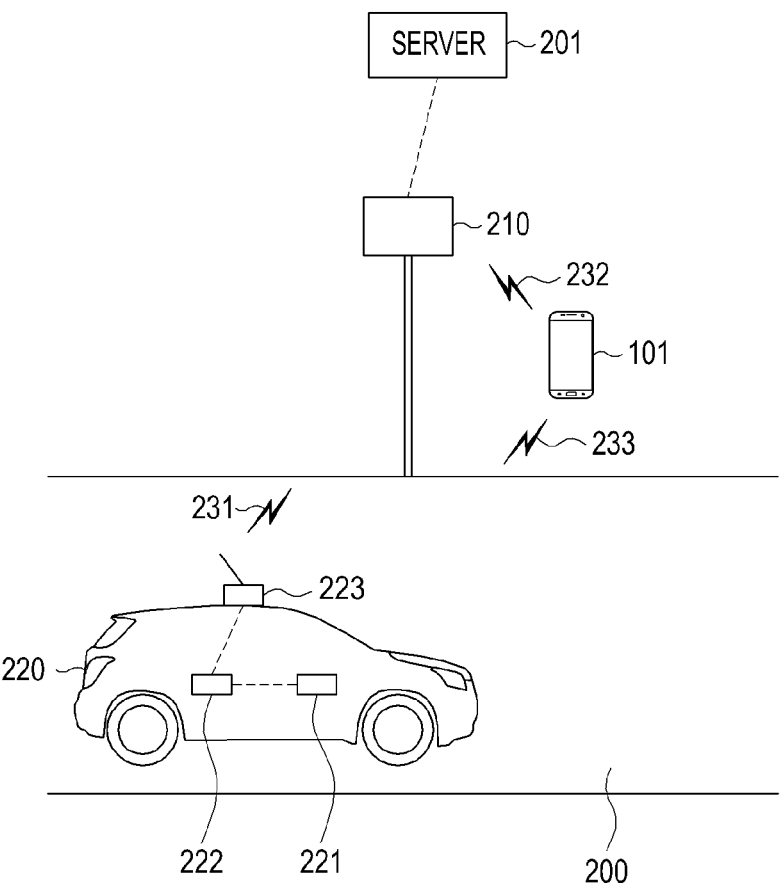
FIG. 2 illustrates an electronic device, a vehicle, and a roadside BS according to various embodiments of the present disclosure.

FIG. 2 illustrates an electronic device, a vehicle, and a roadside Base Station (BS) according to various embodiments of the present disclosure.

As illustrated in FIG. 2, a vehicle 220 may be located on a road 200. A roadside BS 210 may be located near the road 200. The vehicle 220 may include a terminal platform 221, a vehicle communication module 222, and an antenna 223. The terminal platform 221 may control various operations of the vehicle 220 and acquire various pieces of information related to the vehicle 220. For example, the vehicle 220 may receive data measured from various sensors such as a speed-measuring unit, an acceleration-measuring unit, a direction-measuring unit, a brake detector, a location-measuring device (for example, a GPS module), or a roadside state detector. The terminal platform 221 of the vehicle 220 may generate transmission data based on various pieces of received data. Alternatively, the terminal platform 221 may generate transmission data based on the size of information included in an internal memory of the vehicle 220 (for example, information related to identification information of the vehicle 220, the size of the vehicle 220, or the performance of the vehicle 220). The vehicle communication module 222 may generate a communication signal based on the transmission data and provide the generated communication signal to the antenna 223. The antenna 223 may transmit the received communication signal 231 to a surrounding entity (for example, the roadside BS 210, the electronic device 101, or another vehicle). The communication signal 231 may include various pieces of information such as the speed of the vehicle 220, acceleration, the driving direction, whether or not a brake is operating, a location, or roadside information. For example, the vehicle 220 may transmit the communication signal 231 defined in a Wireless Access in Vehicle Environment (WAVE) scheme and use a frequency band having a central frequency of 5.8 GHz. In another example, the vehicle 220 may insert a message set related to application for implementing the WAVE scheme, a data frame, a data element, and a Basic Safety Message (BSM) defined in a particular Society of Automotive Engineers (SAE) standard (for example, document J2735) into the communication signal 231 and transmit the communication signal 231. The BSM may include information (for example, latitude, longitude, altitude, or location accuracy) related to the location of the vehicle 220, information (for example, a speed, a direction (heading), a steering wheel angle, and an acceleration set) related to movement, information (for example, a brake system state)

related to brakes, and basic information (for example, Part 1 information) such as the size of the vehicle, and may further include additional information (for example, Part 2 information) according to the circumstances. The additional information (for example, Part 2 information) may be determined by the service type, and may be variable. The information type included in the BSM is only an example, and may be changed in response to changes in standards. It will be easily understood by those skilled in the art that embodiments of the present disclosure are not limited by the information type of the BSM. The vehicle 220 may transmit the communication signal 231 based on a transmission period, a frequency, or an intensity defined in a relevant standard, but this is only an example, and it may be easily understood by those skilled in the art that there is no limit on a transmission condition (for example, a transmission period, a transmission frequency, or a transmission intensity) of the communication signal 231 of the vehicle 220. The vehicle 220 may usually transmit the communication signal 231 including the BSM, and may insert various messages, such as a Common Safety Request (CSR), an Emergency Vehicle Alert (EVA), or Intersection Collision Avoidance (ICA) into the communication signal 231 and transmit the communication signal 231 according to various conditions. The communication signal 231 transmitted by the antenna 223 may include a Contextual Awareness Message (CAM) according to the standard applied to the vehicle 220. The vehicle 220 may broadcast, unicast, or multicast the communication signal 231 to another vehicle, the roadside BS 210, or the electronic device 101 through the antenna 223. At least one of the terminal platform 221, the vehicle communication module 222, or the antenna 223 included in the vehicle 220 may be called an OnBoard Unit (OBU).

The roadside BS 210 may receive the communication signal 231 from the vehicle 220 and extract various pieces of information related to the vehicle 220 from the received communication signal 231. The roadside BS 210 may be located near the road 200, and may be disposed at a position at which pedestrian safety must be ensured or a position at which the accident risk of the vehicle 220 is relatively high, such as a crosswalk, a traffic light, or an intersection. Alternatively, the roadside BS 210 may be disposed such that there is no shaded area. The roadside BS 210 may insert the information into the communication signal 232 and broadcast the communication signal 232 to surrounding areas or transmit the information to the server 201. The server 201 may manage the roadside BS 210, collect vehicle information, collect traffic information, or provide traffic image information. The roadside BS 210 may determine various situations (for example, a traffic accident situation or a vehicle breakdown situation) based on information from the vehicle 220 and transmit a communication signal 232 including the various situations to a vehicle (for example, the vehicle 220 or another vehicle) or the electronic device 101. The roadside BS 210 may broadcast, unicast, or multicast the communication signal 232 including at least one piece of identification information of the roadside BS 210, location information of the roadside BS 210, information related to an adjacent vehicle, or information related to an adjacent pedestrian to an adjacent entity. The roadside BS 210 may transmit warning information depending on the situation. The roadside BS 210 may control a geographic feature (for example, a traffic light) located at a traffic zone according to received information.

The pedestrian may be located near the road 200 while carrying the electronic device 101. The electronic device 101 may transmit a communication signal 233 including acquired information (for example, a location, a speed, a direction, an acceleration, path history information, information related to whether a pedestrian gets in the vehicle, pedestrian behavior information, information on crossing a crosswalk, information on the pedestrian group size, task-related information, information on an obstacle, pedestrian-related information on, or information on an entity accompanying the pedestrian) to the vehicle 220 or the roadside BS 210. The electronic device 101 may generate the communication signal 233 based on information acquired through various sensors (for example, the sensor module 176), information acquired through the input device 150, information acquired through a touch circuit included in the display device 160, or information acquired through the communication module 190. For example, the electronic device 101 may insert a Personal Safety Message (PSM), as defined in a Society of Automotive Engineers (SAE) standard, into the communication signal 233 and transmit the communication signal 233. The PSM may include, for example, information on a user type (for example, unavailable, a pedestrian, a pedal cyclist, a public safety worker, or an animal). The PSM may include, for example, time display information on the time at which the message is generated. The PSM may include, for example, message count information indicating the number of messages generated by the entity that generates the messages. The PSM may include, for example, identifier information for communication (for example, a fixed identifier or a flexible identifier). The PSM may include, for example, information on the location of the electronic device 101 (for example, at least one of a latitude, longitude, or altitude), and may be expressed by, for example, units (cm, $\frac{1}{10}$ decimal degree, or $\frac{1}{10}$ micro degree) of a World Geodetic System (WGS), but there is no limit thereon, as long as a three-dimensional location can be expressed. The PSM may include, for example, information on the accuracy of the detected location of the electronic device 101. The PSM may include, for example, information on a speed. The PSM may include, for example, information on a direction (heading). In the WAVE standard, the above-described various pieces of information may be designated as information which should be necessarily included in the PSM, but the electronic device 101 according to various embodiments of the present disclosure may transmit a communication signal that does not include at least some of the information. That is, there is no limit on information included in the communication signal transmitted by the electronic device 101 according to various embodiments of the present disclosure. Meanwhile, additionally, the PSM may include, for example, acceleration information for each axis. The PSM may include, for example, information on a trace of a movement path of the electronic device 101. The PSM may include, for example, information on a propulsion type (for example, a human-propelled type, an animal-propelled type, or a motorized propelled type). The PSM may include, for example, information on a use state, and the information on the use state may indicate information related to the operation performed by the electronic device 101. Parameters in the use state may include at least one parameter selected from among "unavailable", "other", "idle", "listening to audio", "typing", "calling", "playing a game", "reading", or "viewing". The reading state may be a state in which content for which the screen changes relatively slowly over time, such as e-book content or web browser content, is displayed. The viewing state may be a state in which content such as video, for which the screen changes relatively quickly over time, is displayed. The electronic device 101 may determine the use state of the electronic device 101 based on the type of currently displayed content, whether an audio signal is currently output, the type of application being executed, and whether there is input through an input device. The PSM may include information indicating whether the user of the electronic device 101 desires to cross a crosswalk or indicating that the user of the electronic device 101 is crossing the crosswalk. The PSM may include, for example, information on the cluster size. The PSM may include, for example, information on an event responder type (for example, a tow operator (tow truck driver), an emergency medical service worker (paramedic), a transport department worker, a law enforcement officer, a hazmat responder, and an animal control worker). The PSM may include, for example, information on an activity type (for example, a police officer, a traffic controller, a soldier, and an emergency manager). The PSM may include, for example, an assistance type (for example, information on a disability of a pedestrian such as a vision disability, a hearing disability, a mobility disability, and a mental disability). The PSM may include, for example, information on size (for example, whether the user is an adult or a child or whether the user is hidden by a geographic feature). The PSM may include, for example, information on attachment (accessories) (for example, a stroller, a cart, and a wheelchair). The information on attachment, which will be more specifically described, may include information on the location of a vehicle within which the electronic device 101 was located. The PSM may include, for example, information on the size of attachment. The PSM may include, for example, information on an animal type (for example, a seeing-eye dog). The information type included in the PSM is only an example, and may be changed according to a change in the standard. It may be easily understood by those skilled in the art that embodiments of the present disclosure are not limited by the information type of the PSM. The electronic device 101 may transmit the communication signal 233 based on the transmission period, frequency, and intensity defined in the relevant standard, but these are only examples, and it may be easily understood by those skilled in the art that there is no limit on transmission conditions (for example, the transmission period, the transmission frequency, or the transmission intensity) of the communication signal 233 of the electronic device 101. The electronic device 101 may broadcast, unicast, or multicast the communication signal 233 to the vehicle 220 or the roadside BS 210.

According to various embodiments of the present disclosure, when a predetermined condition is satisfied, the electronic device 101 may be configured to transmit the communication signal 233. When the predetermined condition is not satisfied, the electronic device 101 may not transmit the communication signal 233, and accordingly, a battery may be saved. For example, the electronic device 101 may determine that the current location corresponds to a dangerous area, and when it is determined that the electronic device 101 is located outside the vehicle 220, may transmit the communication signal 233 including the PSM. When the pedestrian moves to the outside of the vehicle 220 due to an accident or breakdown of the vehicle 220, the electronic device 101 may transmit a communication signal 233 including information for pedestrian safety, since the pedestrian is located in the dangerous area (for example, on the highway). The roadside BS 210 may inform the server 201 of the accident or breakdown based on the communication signal 233. The server 201 may make a request for an ambulance or connection to an insurance company according to the emergency. The roadside BS 210 may transmit pedestrian-related information to surrounding vehicles, and other vehicles may drive while taking pedestrian safety into account based on the pedestrian-related information. Alternatively, other vehicles directly receiving the communication signal 233 from the electronic device 101 may drive while taking pedestrian safety into account based on the communication signal 233.

According to various embodiments of the present disclosure, the electronic device 101 may be located, for example, within the vehicle, and in this case, may transmit a communication signal including the BSM. The electronic device 101 may determine that the electronic device 101 is in one of the various states, and determine at least one transmission or reception mode of at least one of the PSM and the BSM according to the state, which will be described below in more detail.

Figure 3A:
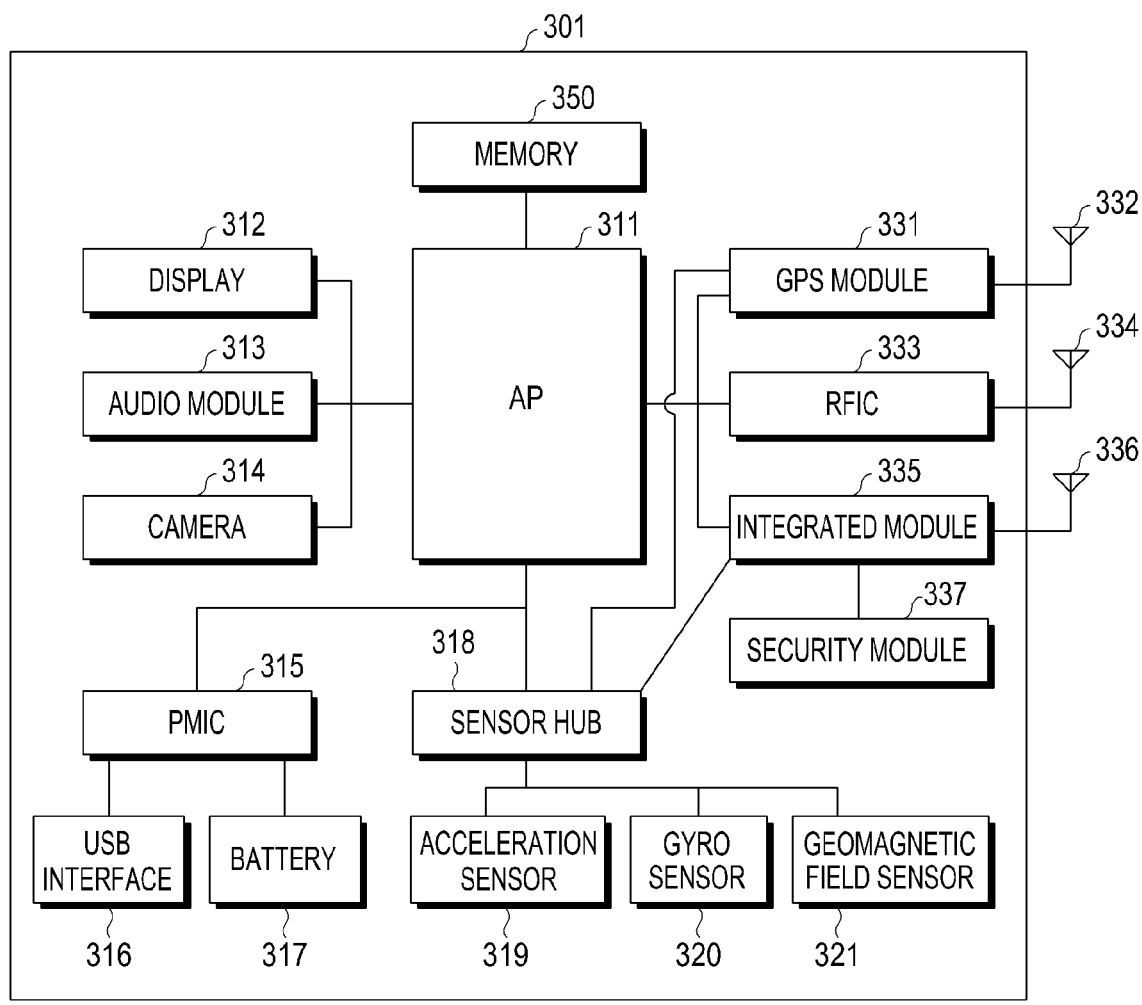
FIGS. 3A and 3B are block diagrams illustrating an electronic device according to various embodiments of the present disclosure.
Figure 3B:
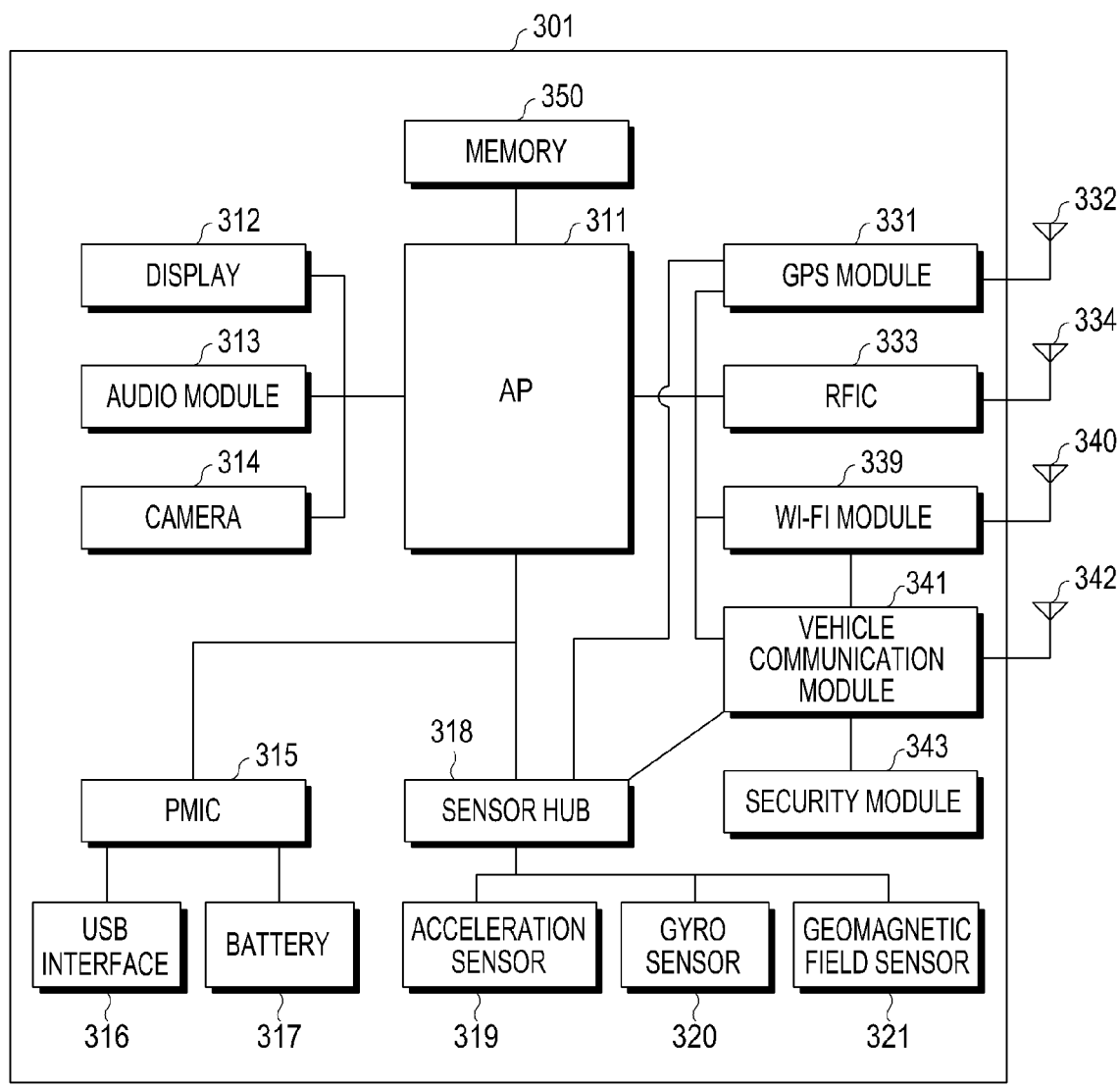

FIGS. 3A and 3B are block diagrams illustrating an electronic device according to various embodiments of the present disclosure.

Referring to FIG. 3A, an electronic device 301 (for example, the electronic device 101) may include an Application Processor (AP) 311, a display 312, an audio module 313, a camera 314, a PMIC 315, a USB interface 316, a battery 317, a sensor hub 318, an acceleration sensor 319, a gyro sensor 320, a geomagnetic field sensor 321, a GPS module 331, a GPS antenna 332, an RFIC 333, an RFIC antenna 334, an integrated module 335, an integrated module antenna 336, a security module 337, and a memory 350.

The AP 311 (for example, the main processor 121) may control the overall operation of the electronic device 301. For example, as an instruction stored in the memory 350 (for example, the memory 130) is executed, the AP 311 may control at least one piece of hardware to perform the operation corresponding to the instruction. The AP 311 may be in one of a sleep state and a wake-up state (awake state). In the sleep state, the AP 311 may not perform any operations and, accordingly, battery consumption by the AP 311 may be reduced. The AP 311 may switch to the wake-up state based on triggering under various conditions, or may switch to one of various states of the electronic device 301. The various states may be states related to transmission or reception of at least one of the PSM or the BSM, which will be described below in more detail with reference to FIG. 4B. In the wake-up state, the AP 311 may operate according to the instruction stored in the memory 350. The AP 311 may acquire various pieces of information, such as data from various sensors, such as the acceleration sensor 319, the gyro sensor 320, or the geomagnetic field sensor 321, data from the GPS module 331, and an image analysis result acquired by the camera 314. The AP 311 may control the integrated module 335 and the integrated module antenna 336 to transmit the communication signal including the acquired information. Although not illustrated, the integrated module 335 and the integrated module antenna 336 may be connected to a Front-End Module (FEM) therebetween.

The integrated module 335 may be implemented as a chipset that may perform both data processing for Wi-Fi and data (for example, data for WAVE) processing related to vehicle safety. For example, the integrated module 335 may be implemented as a chipset manufactured to process data according to IEEE 802.11 a/b/n/p. Further, the integrated module antenna 336 may transmit/receive a communication signal for Wi-Fi and transmit/receive a communication signal (for example, a communication signal for WAVE) related to vehicle safety. For example, the communication signal for Wi-Fi may use a frequency band of a central frequency of 5 GHz, and the communication signal for WAVE may use a frequency band of a central frequency of 5.8 GHz, having a relatively small difference from that of the frequency band for Wi-Fi, so that the integrated module antenna 336 may transmit/receive both communication signals. Although it is illustrated that the number of integrated module antennas 336 is one, this is only an example, and a plurality of antennas may be implemented as required in the communication standard. The security module 337 may store information used for data processing for WAVE, and the integrated module 335 may perform data processing for WAVE based on the stored information. For example, the security module 337 may store various pieces of information such as information used for WAVE modulation/demodulation, information used for encryption/decryption, and information used for processing a message. The integrated module 335, the AP 311, or the sensor hub 318 may directly or indirectly access the security module 337. The security module 337 may be implemented to be integrated with the memory 350 or may be implemented as hardware separate from the memory 350 depending on the implementation. The integrated module 335 may receive data from the AP 311, process the data to generate an electric signal corresponding to a communication signal for WAVE, and provide the generated electric signal to the integrated module antenna 336. Alternatively, the integrated module 335 may receive data from the sensor hub 318, process the received data to generate an electric signal corresponding to the communication signal for WAVE, and provide the generated electric signal to the integrated module antenna 336. For example, when the AP 311 is in the wake-up mode, the integrated module 335 may receive data from at least one of the AP 311 or the sensor hub 318. When the AP 311 is in the sleep state, the integrated module 335 may receive data from the sensor hub 318. The sensor hub 318 (for example, the auxiliary processor 123) may include at least one of a processing circuit, which may acquire data from at least one of the sensors (for example, the acceleration sensor 319, the gyro sensor 320, or the geomagnetic field sensor 321) or the GPS module 331 and process the acquired data, and a storage circuit, which may temporarily or permanently store the data. The integrated module 335 may include at least one of a processing circuit, which may process the communication signal for WAVE, a transmission circuit, which may transmit the communication signal, and a reception circuit, which may receive the communication signal. The integrated module 335 may perform scanning in order to receive the communication signal at every predetermined period, analyze the scanning, and operate even when the AP 311 is in the sleep state. When the integrated module 335 receives the communication signal and data included in the communication signal meets a predetermined condition, the integrated module 335 may wake up the AP 311. In the sleep state of the AP 311 in a general Wi-Fi operation, when there is at least one previous connection or when the communication signal is received from an access point under a predetermined condition, the AP 311 may be woken up. Since the predetermined condition or information on the access point may be updated, if an update is needed, information of a storage place of the integrated module 335 may be changed by the AP 311 and the integrated module 335 may operate based on the changed information. The integrated module 335 may include a transmission circuit for transmitting the communication signal and a reception circuit for processing a communication signal from another electronic device. The electronic device 101 may selectively activate the transmission circuit and the reception circuit. For example, by deactivating the transmission circuit and activating the reception circuit, the electronic device 101 may scan for the communication signal from another entity without transmitting the communication signal. In this document, a predetermined module for performing communication (for example, the integrated module 335 or a vehicle communication module 341 of FIG. 3B) may be called a communication circuit.

The AP 311 or the sensor hub 318 determines that the current location of the electronic device 101 corresponds to a dangerous area, and when it is determined that the electronic device 101 is located outside the vehicle 220, activate the transmission circuit of the integrated module 335 according to the determination and perform control to transmit the communication signal (for example, the communication signal including the PSM) including data acquired through the activated transmission circuit. The AP 311 or the sensor hub 318 may perform control to transmit the communication signal based on at least some pieces of geographical information on a particular area. For example, when the electronic device 301 enters the particular area, the electronic device 301 may receive geographical information on the particular area through the roadside BS (for example, the roadside BS 210) or the server and store the received geographical information in the memory 350. According to various embodiments of the present disclosure, the memory 350 may store information on a dangerous area. The geographical information according to various embodiments of the present disclosure may be data expressed by a value related to at least one of latitude, longitude, or altitude or data in image form. When it is determined that the location information of the electronic device 301 identified through the GPS module 331 belongs to a predetermined location (for example, a dangerous area), the AP 311 or the sensor hub 318 may control the integrated module 335 to transmit the communication signal. When the AP 311 is in the sleep state, the sensor hub 318 may receive only at least some pieces of the geographical information on the particular area from the memory 350, store the received geographical information, and compare the stored geographical information with the current location of the electronic device 301 identified through the GPS module 331. The sensor hub 318 may determine whether to transmit the communication signal based on the comparison result.

The display 312 (for example, the display 160) may display various graphic objects (for example, a Graphic User Interface (GUI)) related to vehicle safety. According to various embodiments of the present disclosure, the display 312 may display a graphic object for activating transmission/reception of the communication signal for WAVE, and the AP 311 may transmit/receive the communication signal for WAVE in response to input from the user. The audio module 313 (for example, the audio module 170) may output a vehicle-related warning sound. The camera 314 (for example, the camera module 180) may photograph an image, and the AP 311 may determine whether to activate transmission/reception of the communication signal for WAVE based on the image received from the camera 314. The PMIC 315 (for example, the power management module 188) may control at least one of the voltage or the current of power from the battery 317 (for example, the battery 189) to be a value suitable for each piece of hardware and supply the voltage or the current. A cable for wired power transmission may be connected through the USB interface 316 (for example, the interface 177), and the electronic device 301 may receive power through the USB interface 316 (for example, the interface 177). The RFIC 333 may be implemented as, for example, a chipset for data communication, and may generate an electric signal corresponding to a signal for data communication based on data from the AP 311 and provide the generated electric signal to the RFIC antenna 334. The acceleration sensor 319 may identify acceleration of the electronic device 301, the gyro sensor 320 may identify rotation information, and the geomagnetic field sensor 321 may identify geometric field information. The AP 311 or the sensor hub 318 may insert information into the communication signal (for example, the communication signal including the PSM) to be transmitted through the integrated module 335 based on data from various sensors (for example, the acceleration sensor 319, the gyro sensor 320, or the geomagnetic field sensor 321) or the GPS module 331. According to various embodiments of the present disclosure, the electronic device 301 may not include the sensor hub 318. In this case, the AP 311 may determine whether to transmit the communication signal while being always in the wake-up state or by being periodically woken up.

According to various embodiments of the present disclosure, the AP 311 or the sensor hub 318 may execute a Vulnerable Road User (VRU) safety application. The VRU safety application may be an application that may generate the above-described BSM or PSM. The VRU safety application may determine a location, a direction, a speed, and a time of the electronic device 101 or relative locations from other entities based on at least some of data from the GPS module 331, data acquired from a BLE positioning system, and data collected from various sensors (for example, the acceleration sensor 319, the gyro sensor 320, or the geomagnetic field sensor 321). The VRU safety application may determine the time point at which the PSM is generated or the corresponding PSM is transmitted according to a detected event.

According to various embodiments of the present disclosure, the AP 311 or the sensor hub 318 may select one of various states of the electronic device 301 and determine a transmission mode or a reception mode of the PSM or the BSM according to the selected state. The AP 311 or the sensor hub 318 may control a transmission/reception mode of the integrated module 335 (or the vehicle communication module 341 of FIG. 3B) according to the determined transmission/reception mode.

FIG. 3B is a block diagram of an electronic device according to various embodiments of the present disclosure. The electronic device 301 according to an embodiment of FIG. 3B may include a Wi-Fi module 339 and a vehicle communication module 341 instead of the integrated module 335 of FIG. 3A. The Wi-Fi module 339 may be implemented as a chipset that performs Wi-Fi communication, and the vehicle communication module 341 may be implemented as a chipset that may perform, for example, WAVE communication. A communication signal for Wi-Fi may be transmitted/received through the Wi-Fi antenna 340 connected to the Wi-Fi module 339. Through a vehicle communication antenna 342 connected to the vehicle communication module 341, for example, a communication signal for WAVE (for example, a communication signal including the PSM or a communication signal including the BSM) may be transmitted/received. The vehicle communication module 341 may also include a transmission circuit and a reception circuit. The vehicle communication module 341 may be called a communication module for WAVE when implemented according to the WAVE standard. According to various embodiments of the present disclosure, the vehicle communication module 341 and the Wi-Fi module 339 may be connected to respective antennas 340 and 342, as illustrated in FIG. 3B, but the vehicle communication module 341 and the Wi-Fi module 339 may share an antenna in another embodiment.

Although not illustrated, the electronic device 301 may be implemented as a dongle-type device. In this case, the electronic device 301 may be implemented in, for example, a simple form including a control circuit (for example, a Micro Controlling Unit (MCU), a Digital Signal Processor (DSP), a Field-Programmable Gate Array (FPGA), or a Central Processing Unit (CPU)) for calculations with the vehicle communication module 341 and the vehicle communication antenna 342. The electronic device 301 may be connected to another electronic device (for example, the electronic device 101) through a wire or wirelessly, and may receive sensor data or data related to the location from another electronic device and transmit a communication signal including the data (for example, the communication signal including the PSM or the communication signal including the BSM).

Figure 4A:
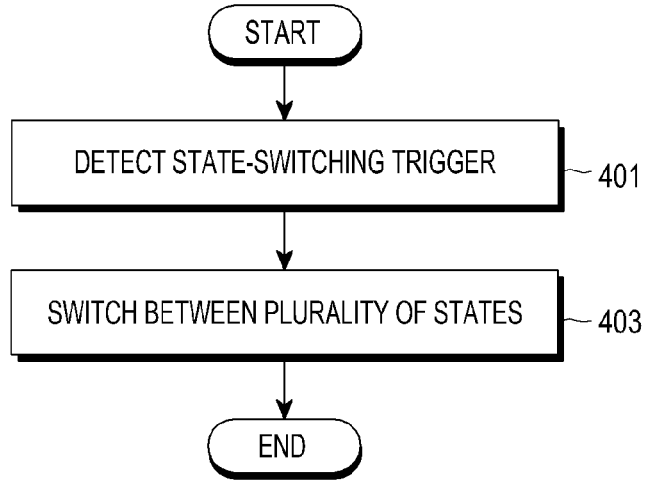
FIG. 4A is a flowchart illustrating a switching operation method between a plurality of states of an electronic device according to various embodiments of the present disclosure.
Figure 4B:
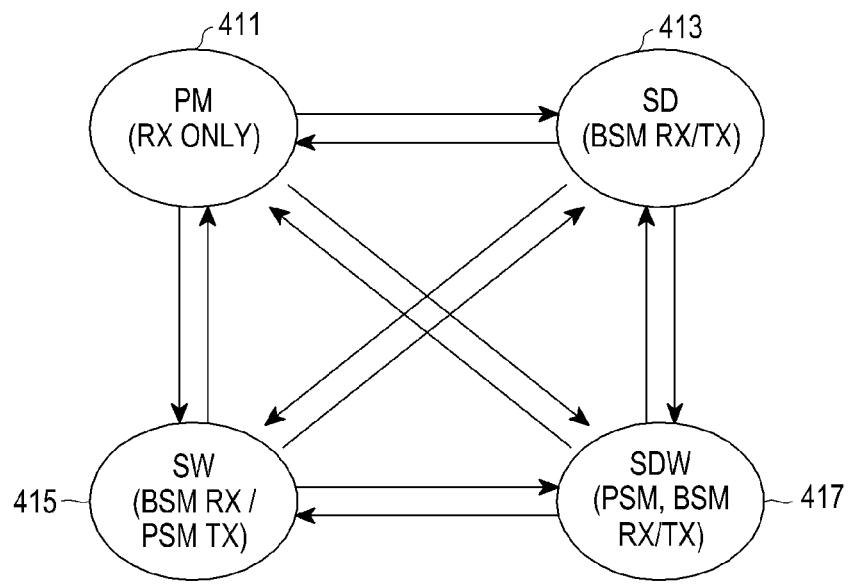
FIG. 4B illustrates state switching according to various embodiments of the present disclosure.

FIG. 4A is a flowchart illustrating a switching operation method between a plurality of states of an electronic device according to various embodiments of the present disclosure. The embodiment of FIG. 4A will be described in more detail with reference to FIG. 4B. FIG. 4B illustrates state switching according to various embodiments of the present disclosure.

A trigger for switching between a plurality of states related to all or one of transmission/reception of both a first signal (for example, the signal including the PSM) and a second signal (for example, the signal including the BSM) and transmission/reception of one thereof may be generated or detected. In operation 401, the electronic device 101 (for example, the processor 120) may detect a trigger. For example, the electronic device 101 may detect a trigger for state switching based on transmission/reception of the first signal or the second signal or reception of state information of the vehicle. In this document, the performance of a particular operation by the electronic device 101 may mean the performance of the particular operation by, for example, the processor 120 (for example, the AP 311 or the sensor hub 318) included in the electronic device 101 or the electronic device 301 or controlling another piece of hardware to perform the particular operation. Alternatively, the performance of the particular operation by the electronic device 101 may mean the performance of the particular operation by the processor 120 (for example, the AP 311 or the sensor hub 318) or controlling another piece of hardware to perform the particular operation when, for example, an instruction stored in the memory 130 (for example, the memory 350 or the memory included in the sensor hub 318) included in the electronic device 101 is executed. The first signal may include information generated based at least partly on the state of the electronic device 101. The second signal may include information generated based at least partly on the state of the vehicle. The first signal and the second signal may comply with the Society of Automotive Engineers (SAE) J2735 standard, wherein the first signal may include the Personal Safety Message (PSM) according to the standard and the second signal may include the Basic Safety Message (BSM) according to the standard. In operation 403, the electronic device 101 may switch the state between a plurality of states of the electronic device 101 based at least on the generated or detected trigger. The plurality of states may be associated with at least one of transmission or reception of at least one of the first signal or the second signal. For example, a first state of the plurality of states may be a state in which the electronic device 101 receives the first signal and the second signal. For example, the first state may be a Pedestrian Mode (PM) 411 in FIG. 4B. In the first state, the electronic device 101 may perform signal reception (RX). A second state, among the plurality of states, may be the state in which the electronic device 101 transmits and receives the second signal. For example, the second state may be a Safety Driving (SD) mode 413 in FIG. 4B. The electronic device 101 may perform BSM reception/transmission (BSM RX/TX) in the SD mode 413. A third state among the plurality of states may be a state in which the electronic device 101 transmits the first signal and receives the second signal. For example, the third state may be a Safety Walking (SW) mode 415 in FIG. 4B. The electronic device 101 may perform BSM reception (BSM RX) and PSM transmission (PSM TX) in the SW mode 415. A fourth state of the plurality of states may be a state in which the electronic device 101 transmits and receives the first signal and the second signal. For example, the fourth state may be a Safety Driving & Walking (SDW) mode 417 in FIG. 4B. The electronic device 101 may perform BSM/PSM transmission/reception (BSM/PSM RX/TX) in the SDW mode 417.

According to various embodiments of the present disclosure, the electronic device 101 may switch to the first state when the electronic device 101 is located outside the vehicle or when the electronic device is located inside the vehicle while receiving the second signal from the vehicle during a selected time period.

According to various embodiments of the present disclosure, the electronic device 101 may switch to the second state when the electronic device 101 is located inside the vehicle while not receiving the second signal from the vehicle during the selected time period.

According to various embodiments of the present disclosure, the electronic device 101 may switch to the third state when the electronic device is located in a dangerous area while being located outside the vehicle.

According to various embodiments of the present disclosure, the electronic device 101 may switch to the fourth state when the electronic device 101 is located in a dangerous area outside the vehicle while not receiving the second signal from the vehicle during the selected time period.

According to various embodiments of the present disclosure, the electronic device 101 may switch to the second state (for example, the SD mode 413), the third state (for example, the SW mode 415), or the fourth state (for example, the SDW mode 417) from the first state (for example, the PM 411) as illustrated in FIG. 4B. The electronic device 101 may switch to the first state (for example, the PM 411) or the fourth state (for example, the SDW mode 417) from the second state (for example, the SD mode 413) as illustrated in FIG. 4B. The electronic device 101 may switch to the first state (for example, the PM 411) or the second state (for example, the SD mode 413) from the third state (for example, the SW mode 415) as illustrated in FIG. 4B. The electronic device 101 may switch to the first state (for example, the PM 411) or the second state (for example, the SD mode 413) from the fourth state (for example, the SDW mode 417) as illustrated in FIG. 4B. Although not illustrated, the electronic device 101 may provide various outside linkage services such as services for accessing a traffic-related webpage, calling an ambulance, making an emergency service call, and connecting to an insurance company in an exclusive service mode.

Figure 4C:
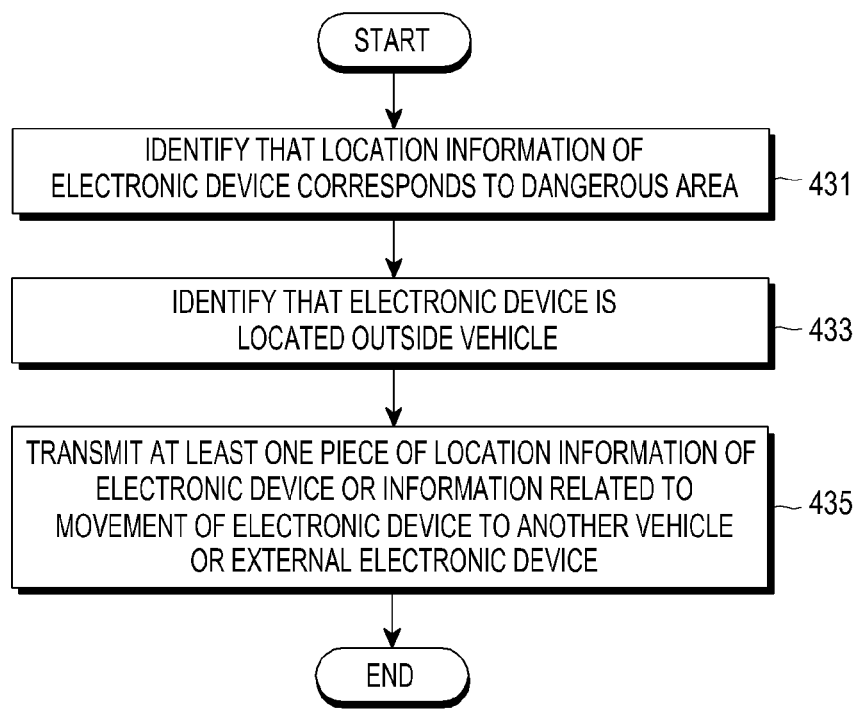
FIG. 4C is a flowchart illustrating an operation method of an electronic device moving to a dangerous area according to various embodiments of the present disclosure.

FIG. 4C is a flowchart illustrating an operation method of an electronic device moving to a dangerous area according to various embodiments of the present disclosure.

In operation 431, the electronic device 101 (for example, the processor 120) may identify that location information of the electronic device 101 corresponds to a dangerous area.

According to various embodiments of the present disclosure, the electronic device 101 (for example, the processor 120, the AP 311, or the sensor hub 318) may identify the current location of the electronic device 101 based on, for example, data from the GPS module 331. The electronic device 101 may identify the current location of the electronic device 101 based on, for example, data acquired from a BLE positioning system. The electronic device 101 may identify the current location of the electronic device 101 based on, for example, a positioning scheme by a communication signal transmitted from an Access Point (AP) or a beacon signal transmission device. The electronic device 101 may determine the current location of the electronic device 101 according to various location-measuring methods, and there is no limit on the location-measuring method.

According to various embodiments of the present disclosure, the electronic device 101 (for example, the processor 120, the AP 311, or the sensor hub 318) may store information on a dangerous area. When the electronic device 101 enters a particular area, the electronic device 101 may receive geographical information on the particular area through a communication module (for example, the communication module 190, the RFIC 333, the integrated module 335, the Wi-Fi module 339, or the vehicle communication module 341). The electronic device 101 may receive geographical information from a geographical information provision server or the roadside BS. The electronic device 101 may receive geographical information according to user identification or may receive geographical information even when the user is not identified. The electronic device 101 may identify that the electronic device has moved out of the particular area, and in this case, may delete the geographical information on the particular area and receive geographical information on another area. The electronic device 101 may delete geographical information in descending order of storage term, starting at the earliest stored geographical information, or in ascending order of loading frequency, starting at the most seldom loaded geographical information. The geographical information may be expressed, for example, by at least one of latitude, longitude, or altitude. The geographical information may include at least one piece of information on a dangerous area and information on a safe area expressed as at least one of latitude, longitude, or altitude. For example, a sidewalk area may be classified as the safe area, and a road or a highway area may be classified as the dangerous area. Since a pedestrian overpass is higher than a road, it may be classified as the safe area. Areas having the same latitude and longitude may be differently classified as the dangerous area or the safe area depending on altitude. A crosswalk may be classified as a safe area during a walk signal and classified as a dangerous area during a don't-walk signal. The geographical information may include conditions (for example, a time condition, or a condition for a reception state of a particular signal) for classifying a particular area (for example, the crosswalk) as a dangerous area or a safe area.

According to various embodiments of the present disclosure, the electronic device 101 (for example, the processor 120, the AP 311, or the sensor hub 318) may determine whether information on the location of the dangerous area of the geographical information corresponds to the current location of the electronic device 101. Alternatively, the electronic device 101 may further determine whether the condition included in the geographical information is satisfied and determine whether the electronic device 101 is located in the dangerous area. For example, when the current location of the electronic device 101 corresponds to a location corresponding to latitude, longitude, and altitude of the crosswalk, the electronic device 101 may additionally determine whether a walk signal for the crosswalk is being applied or whether information related to the walk signal for the crosswalk is received from the roadside BS. When the walk signal for the crosswalk is being applied or when a communication signal indicating that the walk signal for the crosswalk is being applied is received from the roadside BS, the electronic device 101 may determine that the current location is a crosswalk and that the electronic device 101 is in a safe area. When the current time is a period during which the don't-walk signal for the crosswalk is applied or when a communication signal indicating that the current time is the period during which the don't-walk signal for the crosswalk is applied is received from the roadside BS, the electronic device 101 may determine that the current location is a crosswalk and that the electronic device 101 is in a dangerous area.

In operation 433 of FIG. 4C, the electronic device 101 (for example, the processor 120, the AP 311, or the sensor hub 318) may identify that the electronic device 101 is located outside the vehicle 220. For example, the electronic device 101 may determine whether the electronic device 101 is located outside the vehicle 220 according to reception of a signal related to an open/closed state of a door of the vehicle 220. The electronic device 101 may determine whether the electronic device 101 is located outside the vehicle 220 based on, for example, at least one of whether the door of the vehicle 220 opens, an on/off state of the vehicle 220, a distance between the electronic device 101 and the vehicle 220, or a direction. The electronic device 101 may determine whether the electronic device 101 is located outside the vehicle 220 based on various methods, and there is no limit as to the method of determining whether the electronic device 101 is located outside the vehicle 220.

The orders of operations 431 and 433 of FIG. 4C may be changed. For example, according to various embodiments of the present disclosure, when the electronic device 101 (for example, the processor 120, the AP 311, or the sensor hub 318) determines that the electronic device 101 is in a dangerous area, the electronic device 101 may determine whether the electronic device 101 is located outside the vehicle 220 according to the determination. Alternatively, when the electronic device 101 identifies that the electronic device 101 is located outside the vehicle 220, the electronic device 101 may determine whether the electronic device 101 is located in the dangerous area according to the identification. Alternatively, the electronic device 101 may perform operations 431 and 433 in parallel. For example, the electronic device 101 may periodically or aperiodically determine whether the electronic device 101 is located in the dangerous area, and independently therefrom, may periodically or aperiodically determine whether the electronic device 101 is located outside the vehicle 220.

In operation 435 of FIG. 4C, the electronic device 101 (for example, the processor 120, the AP 311, or the sensor hub 318) may transmit at least one piece of location information of the electronic device 101 or information related to movement of the electronic device 101 to another vehicle or an external electronic device (for example, the roadside BS 210). For example, the electronic device 101 may identify or determine at least some of the information defined in the PSM. The electronic device 101 may transmit, for example, a communication signal including at least some of the information according to the PSM. According to the above description, the electronic device 101 usually does not transmit the communication signal including the PSM, and when the electronic device 101 is located in a dangerous area outside the vehicle 220 such as a car, may transmit the communication signal.

Figure 5:
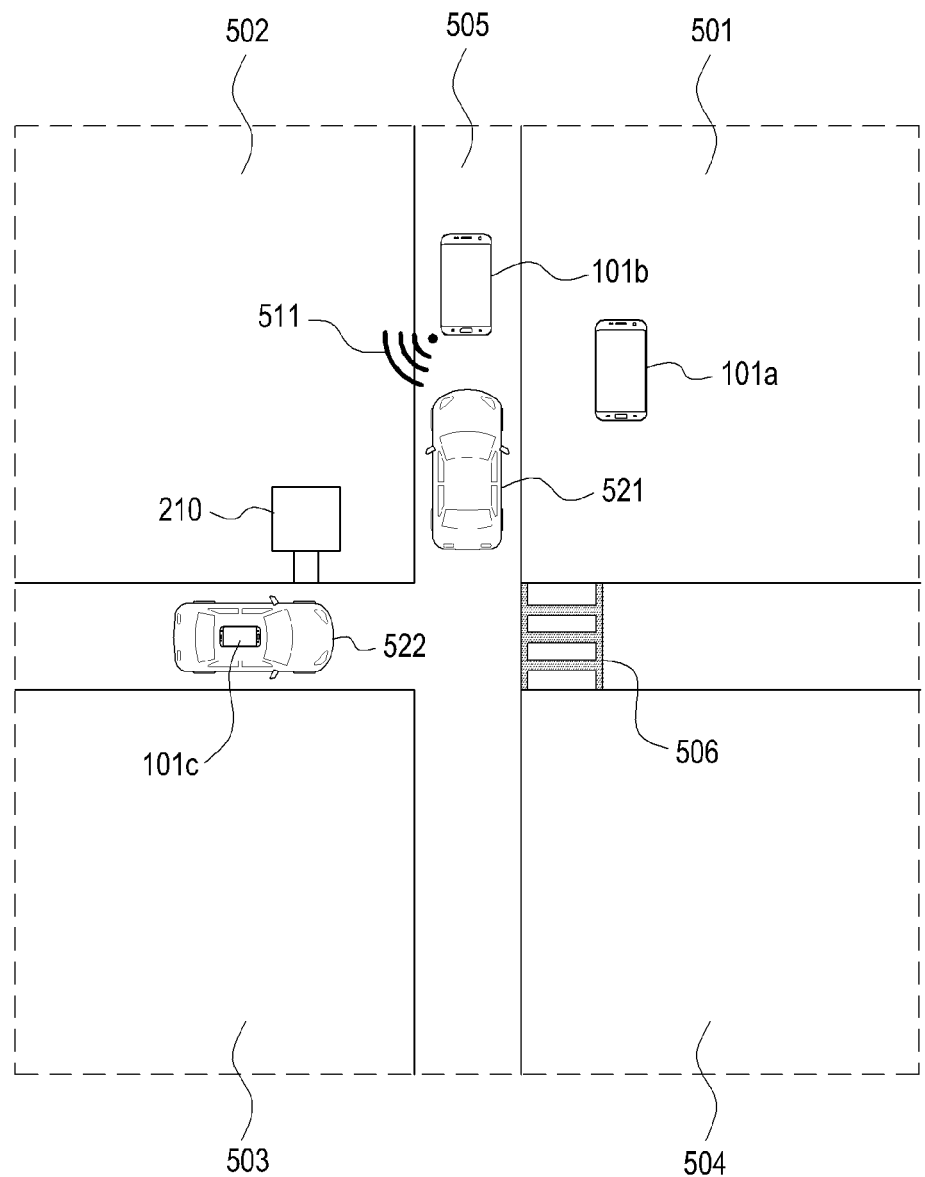
FIG. 5 illustrates relative locations of a road including an electronic device, a vehicle, and a crosswalk, and a roadside BS according to various embodiments of the present disclosure.

FIG. 5 illustrates relative locations of an electronic device, a vehicle, a road including a crosswalk, and a roadside BS according to various embodiments of the present disclosure.

Referring to FIG. 5, electronic devices 101a, 101b, and 101c may be located in areas of a sidewalk 501, 502, 503, or 504, a road 505, and a crosswalk 506. Each of the devices 101a, 101b, and 101c may receive geographical information of the corresponding areas. The geographical information may include location information of the road 505 classified as the dangerous area, location information of the sidewalk 501, 502, 503, or 504 classified as the safe area, location information of the crosswalk 506, and conditions for classifying the dangerous area and the safe area. For example, each of the electronic devices 101a, 101b, and 101c may receive the geographical information shown in [Table 1].

TABLE 1

| Dangerous area or not | Location information | Identification information | condition |
|---|---|---|---|
| Dangerous area | (A, B, C) | road | nothing |
| Safe area | (D, E, F) | sidewalk | nothing |
| Dangerous/safe area | (G, H, I) | crosswalk | current time belongs to time range of J information indicating that don't-walk signal is being applied is received |

Location information (A, B, C), (D, E, F), and (G, H, I) may be values which may be expressed by ranges of latitude, longitude, or altitude, and there is no limit on the method of expressing the location information. J may be information included in at least one time range within which a traffic light of a crosswalk applies a don't-walk signal. According to various embodiments of the present disclosure, the geographical information may include only location information of the dangerous area, or may further include various pieces of information as well as the location information of the dangerous area. The information on the dangerous area may be updated periodically or aperiodically. Further, when movement of the vehicle 220 is detected on the sidewalk, the corresponding sidewalk may be temporarily classified as a dangerous area. When the electronic device 101 receives a communication signal from the roadside BS 210 or the vehicle 220, the electronic device 101 may determine that the sidewalk is a dangerous area based on the communication signal. For example, the electronic device 101a may determine that the current location belongs to the range of location information (D, E, F) of the safe area, and may not transmit a separate communication signal. For example, the electronic device 101b may determine that the current location belongs to the range of location information (A, B, C) of the dangerous area and identify that the electronic device 101b is located outside the vehicle. The electronic device 101b may transmit a communication signal 511 including information related to pedestrian safety, for example, at least one piece of location information of the electronic device 101b or movement information of the electronic device 101b, for example, a communication signal 511 including the PSM. The vehicle 521 may identify at least one piece of location information of the electronic device 101*b* or movement information of the electronic device 101*b* by receiving the communication signal 511, and may control driving based at least partially on the information. Accordingly, the safety of the pedestrian having the electronic device 101*b* can be increased. For example, the electronic device 101*c* may determine that the current location belongs to the range of location information (A, B, C) of the dangerous area and identify that the electronic device 101*c* is located inside the vehicle 522. Since the condition under which the electronic device 101*c* is located outside the vehicle is not satisfied, the electronic device 101*c* may not transmit the communication signal.

When the electronic device 101 (for example, the processor 120, the AP 311, or the sensor hub 318) according to various embodiments of the present disclosure enters a particular area, the electronic device 101 may receive geographical information of the corresponding area. If storage space is insufficient, the electronic device 101 may delete geographical information that was stored earliest or geographical information that has been loaded least frequently. When receiving the geographical information from a provision server, the electronic device 101 may identify a version of the geographical information through the server before a predetermined time passes. For example, when the user stays in city A and enters city B, the electronic device 101 may have local geographical information of city A but may not have local geographical information of city B. In this case, the electronic device 101 may first receive location information of the area closest to the current location through the server. However, when an accident unavoidably occurs at a time point at which reception of the geographical information is not completed, the electronic device 101 may identify whether the current location corresponds to a dangerous area through the server. The electronic device 101 may receive a communication signal including information on whether the electronic device 101 is within a dangerous area from the server. The electronic device 101 may determine whether the electronic device 101 is within a dangerous area based on the received communication signal. When the electronic device 101 does not receive a response from the server within a predetermined time, the electronic device 101 may first determine whether the current location is considered a dangerous area and transmit a communication signal including the PSM. Thereafter, when it is determined that the current location of the electronic device 101 is not considered a dangerous area, the electronic device 101 may stop transmitting the communication signal including the PSM. Alternatively, when a message indicating transmission of the communication signal is output and user input for stopping transmitting the communication signal is detected, the electronic device 101 may stop transmission of the communication signal including the PSM according thereto. Before transmitting the communication signal including the PSM, the electronic device 101 may display a user interface inquiring about whether to transmit the communication signal including the PSM (for example, a graphic object including the text "You are in a dangerous area. Do you want to generate and transmit a PSM?). When user input for indicating the communication signal is detected, the electronic device 101 may transmit the communication signal including the PSM.

Figure 6:
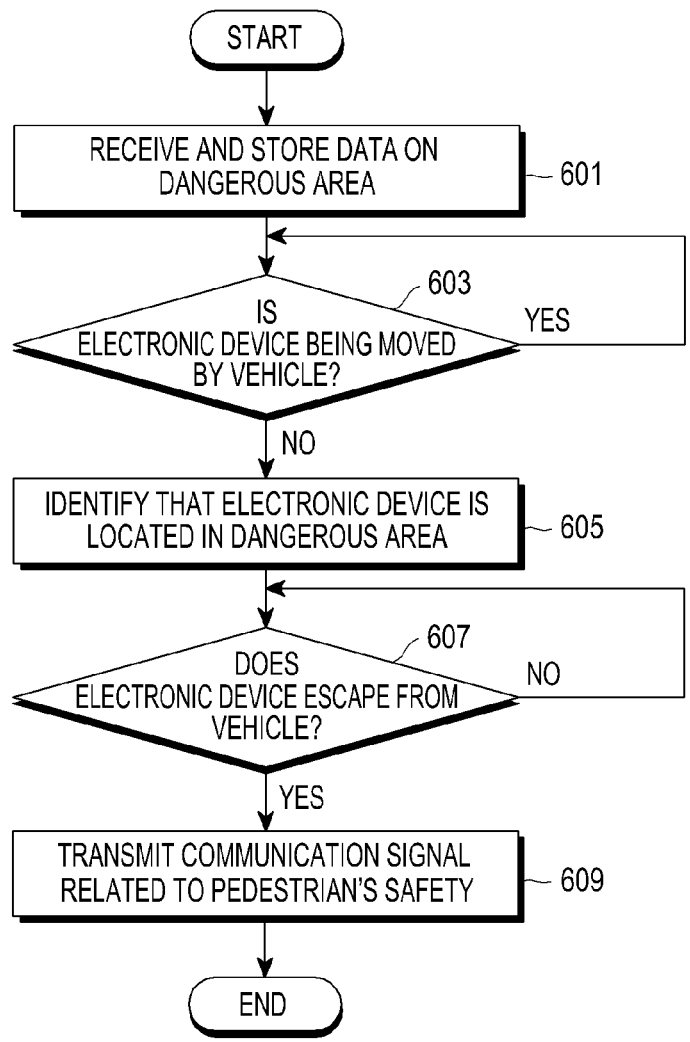
FIG. 6 is a flowchart illustrating an operation method of an electronic device in a predetermined dangerous area according to various embodiments of the present disclosure.
Figure 7:
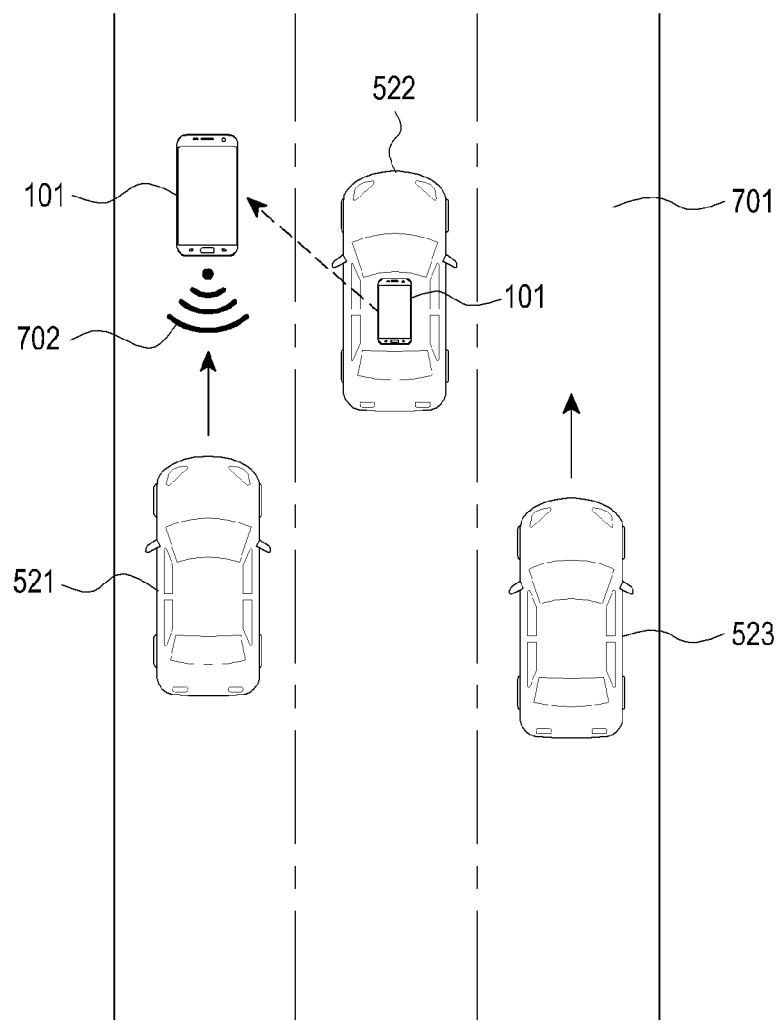
FIG. 7 illustrates locations of an electronic device and a vehicle according to various embodiments of the present disclosure.

FIG. 6 is a flowchart illustrating an operation method of an electronic device in a predetermined dangerous area according to various embodiments of the present disclosure. The embodiment of FIG. 6 will be described in more detail with reference to FIG. 7. FIG. 7 illustrates locations of an electronic device and a vehicle according to various embodiments of the present disclosure.

The electronic device 101 (for example, the processor 120, the AP 311, or the sensor hub 318) according to various embodiments of the present disclosure may receive and store data on a dangerous area in operation 601. In operation 603, the electronic device 101 may determine whether the electronic device 101 is being moved by the vehicle 522. When it is determined that the electronic device 101 is being moved by the vehicle 522, as illustrated in FIG. 7, the electronic device 101 may not start transmission of a communication signal related to pedestrian safety. The electronic device 101 may monitor the speed, and when the speed of the electronic device 101 reaches a predetermined value, determine that the electronic device 101 is being moved by the vehicle 522. The predetermined value may be a speed that the user cannot reach on foot by walking or running. After it is determined that the electronic device 101 is not being moved by the vehicle 522, the electronic device 101 may identify that the electronic device 101 is located in a dangerous area in operation 605. For example, when it is determined that the current location corresponds to received data on the dangerous area, the electronic device 101 may identify that the electronic device 101 is located in the dangerous area (for example, a road 701). In operation 607, it may be determined whether the electronic device 101 escapes from the vehicle 522. For example, it may be determined whether the electronic device 101 escapes from the vehicle 522 based on at least one of an open/closed state of a door of the vehicle 522, an engine on/off state, a distance between the vehicle 522 and the electronic device 101, or a direction. As illustrated in FIG. 7, the vehicle 522 may stop on the road 701 due to an accident or breakdown. The pedestrian may exit the vehicle 522 and, accordingly, the electronic device 101 of the pedestrian may also escape from the vehicle 522. When it is determined that the electronic device 101 escapes from the vehicle 522, the electronic device 101 may transmit a communication signal 702 (for example, the communication signal including the PSM) related to pedestrian safety in operation 609. For example, the communication signal 702 may include information on the location of the electronic device 101 on the road 701, information on the direction in which the electronic device 101 moves on the road 701, and information on the speed at which the electronic device 101 moves on the road 701. The vehicle 521 receiving the communication signal 702 may control driving according to the information included in the communication signal 702. For example, the vehicle 521 driving in a first lane, in which the electronic device 101 is located, may output a message prompting for a decrease in speed, stoppage of driving, a lane change, or another driving control, through an output device of the vehicle 521 (for example, a speaker, an internal display, or a head-up display). Alternatively, the electronic device within the vehicle 521 may receive the communication signal 702 directly or through the vehicle 521 and output a relevant message. The vehicle 523, moving in a place that does not correspond to the location of the electronic device 101, may keep moving without any driving control even though it receives the communication signal 702. According to various embodiments of the present disclosure, the communication signal 702 may include information on the location of the vehicle 522 within which the electronic device 101 was located. The vehicle 521 receiving the communication signal 702 may change the lane to a position (for example, a third lane of the road 701) in which there is no pedestrian or accident vehicle based on the communication signal 702.

Figure 8A:
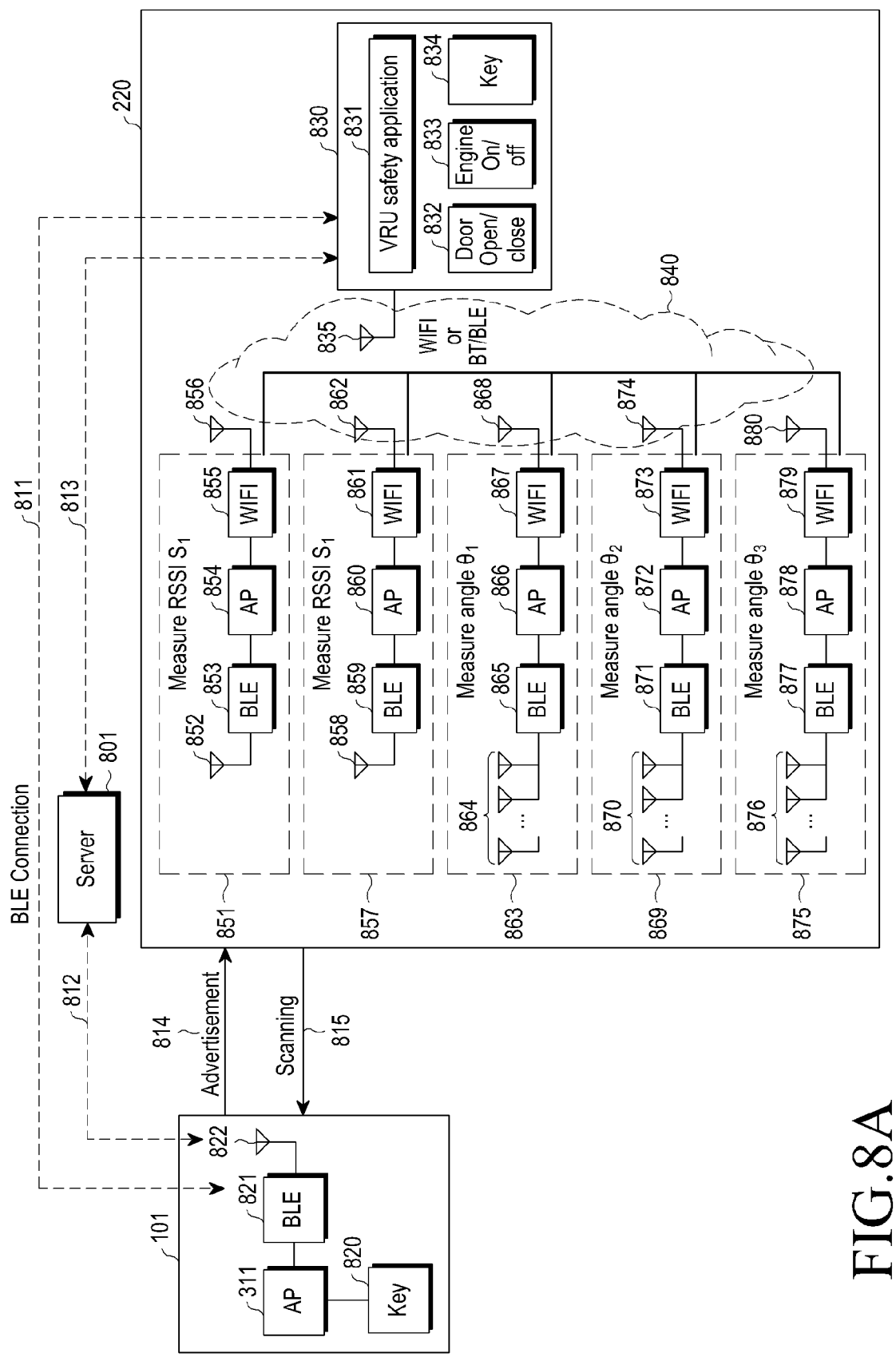
FIGS. 8A and 8B illustrate a method by which it is determined whether an electronic device is located outside a vehicle according to various embodiments of the present disclosure.
Figure 8B:
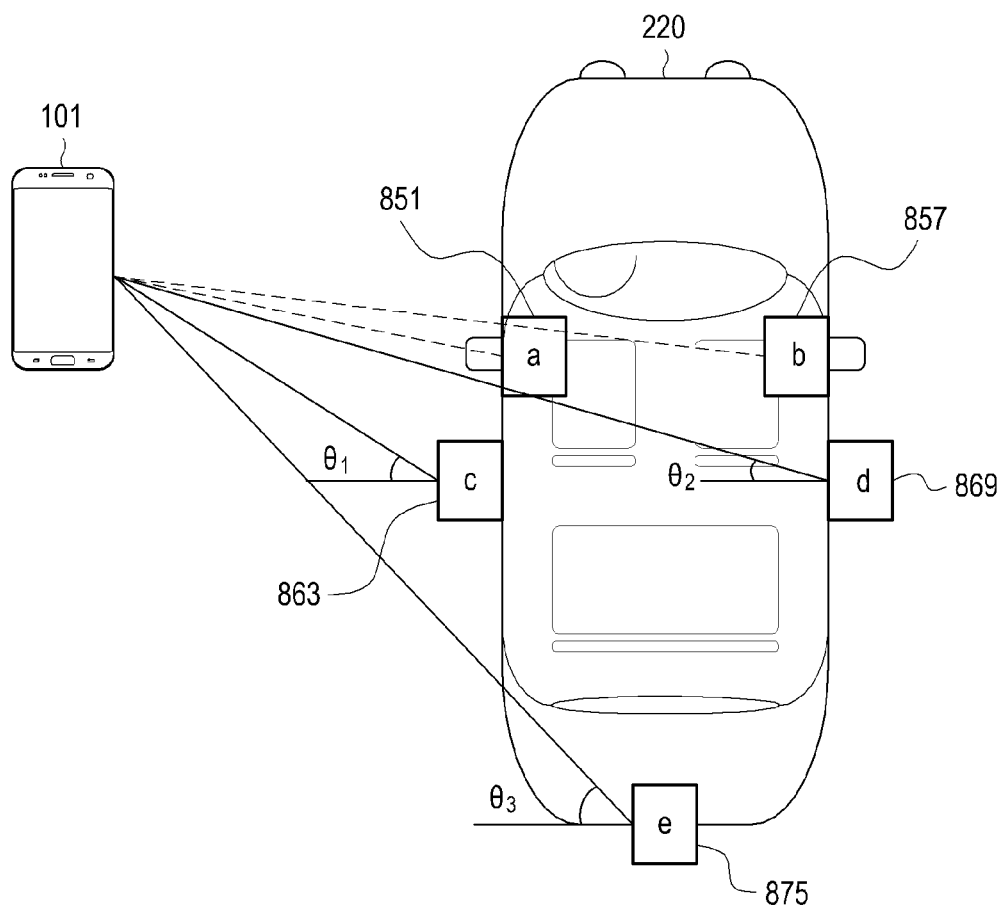

FIGS. 8A and 8B illustrate a method by which it is determined whether an electronic device is located outside a vehicle according to various embodiments of the present disclosure.

The electronic device 101 according to various embodiments of the present disclosure may include the AP 311, a BLE communication module 821, a BLE communication antenna 822, and a key storage module 820. The vehicle 220 may include a control circuit 830, a signal-intensity-measuring module 851 or 857, and an angle-measuring module 863, 869, or 875. The electronic device 101 may form a BLE connection 811 with the vehicle 220. The electronic device 101 and the vehicle 220 may exchange a public key through, for example, a server 801, and store the public key in a key storage module 820 or 834. The electronic device 101 and the vehicle 220 may perform authentication through the key stored in the key storage module 820 or 834, and accordingly, security of measurement information of the vehicle 220 or information related to performance may be increased. The vehicle 220 may transmit a scanning signal 815 through at least one of a plurality of antennas 835, 852, 858, 864, 870, or 876. The electronic device 101 may measure the intensity of the scanning signal 815. The electronic device 101 may determine the distance between the electronic device 101 and the vehicle 220 based on the intensity of the scanning signal 815. The intensity of the scanning signal 815 from the vehicle 220 may be changed according to the distance between the electronic device 101 and the vehicle 220. Accordingly, the electronic device 101 may measure the intensity of the scanning signal 815 and determine the distance between the electronic device 101 and the vehicle 220 based on the signal intensity. When it is determined that the distance exceeds a predetermined value, the electronic device 101 may determine that the electronic device 101 is located outside the vehicle 220. Alternatively, the electronic device 101 may transmit an advertisement signal 814, and the vehicle 220 may determine whether the electronic device 101 is located outside the vehicle 220 based at least partially on the advertisement signal 814. The signal-intensity-measuring module 851 or 857 may measure the signal intensity of the advertisement signal 814 (for example, a Received Signal Strength Indication (RSSI)). The signal-intensity-measuring module 851 or 857 may include a BLE antenna 852 or 858, a BLE communication module 853 or 859, an AP 854 or 860, a Wi-Fi module 855 or 861, and a Wi-Fi antenna 856 or 862. The AP 854 or 860 may measure the signal intensity of the advertisement signal 814 received through each of the BLE antennas 852 to 858. The signal-intensity-measuring module 851 or 857 may communicate with the antenna 835 of the control circuit 830 through the BLE antenna 852 or 858 or the Wi-Fi antenna 856 or 862. The signal-intensity-measuring module 851 or 857 may transmit information on the measured signal intensity through a communication session 840 formed by the BLE antenna 852 or 858 or the Wi-Fi antenna 856 or 862. According to another embodiment, the signal-intensity-measuring module 851 or 857 may transmit/receive data to/from the control circuit 830 through a wire. The angle-measuring module 863, 869, or 875 may transmit/receive data to/from the control circuit 830 through a wire or wirelessly. A Vulnerable Road User (VRU) safety application 831 executed by the control circuit 830 may determine the distance between the electronic device 101 and the vehicle 220 based on the received signal intensity, and, accordingly, determine whether the electronic device 101 is located inside the vehicle 220. According to another embodiment, after determining the distance as described above, the electronic device 101 may transmit the advertisement signal 814 including information on the distance. The control circuit 830 may receive the advertisement signal 814 through the antenna 835 and identify the information on the distance included in the advertisement signal 814. The angle-measuring module 863, 869, or 875 may measure a relative angle (for example, θ1, θ2, or θ3 in FIG. 8B) between the angle-measuring module 863, 869, or 875 and the electronic device 101 based at least on a time point at which the advertisement signal 814 is received. The angle-measuring modules 863, 869, and 875 may include a plurality of antennas 864, 870, and 876, BLE communication modules 865, 871, and 877, APs 866, 872, and 878, Wi-Fi modules 867, 873, and 879, and Wi-Fi antennas 868, 874, and 880, respectively. Time points at which a plurality of antennas 864 included in one angle-measuring module (for example, the angle-measuring module 863) receive the advertisement signal 814 may be different. Since the plurality of antennas 864 are physically spaced apart from each other, the distances between the plurality of antennas 864 and the electronic device 101 are different, and thus the reception time points may be different. The AP 866 may determine the relative angle (θ1) between the angle-measuring module 863 and the electronic device 101 based on the difference in the reception time point of each of the plurality of antennas 864. The angle-measuring module 863, 869, or 875 may determine the relative direction of the electronic device 101 based on the angle-measuring module 863, 869, or 875 according to Angle-Of-Arrival (AOA) positioning technology or Time-Of-Arrival (TOA) positioning technology for an antenna array. The angle-measuring module 863, 869, or 875 may transmit information on the angle measured through the communication session 840 formed by the BLE antenna 864, 870, or 876 or the Wi-Fi antenna 868, 874, or 880. The VRU safety application 831 may identify the received information on the angle. A door-opening/closing-detection module 832 may determine whether the door of the vehicle 220 is open or closed or detect switching of the open/closed state of the door. An engine-on/off-detection module 833 may measure the engine on/off state of the vehicle 220. The VRU safety application 831 may determine whether the electronic device 101 is located outside the vehicle 220 based on at least one of the distance between the electronic device 101 and the vehicle 220, the relative angle between the electronic device 101 and the vehicle 220, the door open/closed state of the vehicle 220, or the engine on/off state of the vehicle 220. The vehicle 220 may transmit information for determining whether the electronic device 101 is located outside the vehicle 220 to the electronic device 101 through the BLE connection 811. When receiving the information indicating that the electronic device 101 is located outside the vehicle 220, the electronic device 101 may transmit the communication signal including the PSM. Alternatively, the vehicle 220 may transmit, to the electronic device 101, at least one of the distance between the electronic device 101 and the vehicle 220, the relative angle between the electronic device 101 and the vehicle 220, the door open/closed state of the vehicle 220, or the engine on/off state of the vehicle 220. The electronic device 101 may determine whether the electronic device 101 is located outside the vehicle 220 based on at least one of the received distance between the electronic device 101 and the vehicle 220, the received relative angle between the electronic device 101 and the vehicle 220, the received door open/closed state of the vehicle 220, or the received engine on/off state of the vehicle 220. When receiving the information indicating that the electronic device 101 is located outside the vehicle 220, the electronic device 101 may transmit the communication signal including the PSM. When it is determined that the electronic device 101 is located inside the vehicle 220, the electronic device 101 may transmit the communication signal including the BSM. Alternatively, when it is determined that the electronic device 101 is located inside the vehicle 220, the electronic device 101 may transmit the communication signal including the PSM, the PSM including information indicating that the user thereof is boarding the vehicle 220.

FIGS. 9A and 9B and FIGS. 10 and 11 are flowcharts illustrating the operation of an electronic device and a vehicle according to various embodiments of the present disclosure.

In operation 901, the electronic device 101 (for example, the processor 120, the AP 311, or the sensor hub 318) according to various embodiments of the present disclosure may form a communication session (for example, BLE connection) with the vehicle 220 through a communication module (for example, the BLE communication module 821). In operation 903, the electronic device 101 may identify that current location information corresponds to the dangerous area. In operation 905, the vehicle 220 may detect an accident (or breakdown) during driving. For example, the vehicle 220 may detect the accident during driving based on the identified acceleration, a speed change, an external impact, and whether an airbag operates or not. In operation 907, the vehicle 220 may transmit accident information (or breakdown information) to the electronic device 101 through the communication session. In operation 909, the electronic device 101 may receive accident information and identify at least one of location information of the electronic device 101 or movement information of the electronic device 101. For example, the electronic device 101 may identify or determine at least some of the information defined in the PSM. In operation 911, the electronic device 101 may identify that the electronic device 101 escapes from the vehicle 220. In operation 913, the electronic device 101 may transmit the communication signal including at least one of the location information, the movement information, or the accident information of the electronic device 101. According to another embodiment of the present disclosure, the electronic device 101 may transmit the communication signal if the electronic device 101 receives the accident information even though the electronic device 101 does not escape from the vehicle.

The electronic device 101 (for example, the processor 120, the AP 311, or the sensor hub 318) according to various embodiments of the present disclosure may transmit a communication signal including information on the location of the vehicle 220 in which the electronic device 101 is located. For example, the electronic device 101 may determine that location information of the position at which the electronic device 101 escapes from the vehicle 220 is location information of the vehicle 220. For example, the electronic device 101 may determine that location information of the electronic device 101 at the time point at which a change in the open/closed state of the door of the vehicle 220 is detected is location information of the vehicle 220. The electronic device 101 may transmit a communication signal including location information of the current location and location information of the vehicle 220. Another vehicle may identify the location of the pedestrian and the location of the vehicle 220, which stops on the road due to an accident or breakdown, by analyzing the communication signal received from the electronic device 101, and may control driving according to the location of the pedestrian or the vehicle that was involved in the accident or broke down. For example, the electronic device 101 may insert accident information such as the location of the vehicle 220 into a particular field of the PSM (for example, information on attachment) and transmit the PSM. The accident information may include various pieces of information such as the location of the vehicle 220, information on the time point at which the accident occurs, identification information of the vehicle 220, and the size of the vehicle 220, and may include at least one some pieces of information defined in the BSM. The electronic device 101 may generate at least one piece of accident information based at least partially on the BSM from the vehicle 220, or may generate at least some pieces of accident information based at least partially on the identified data.

Figure 9A:
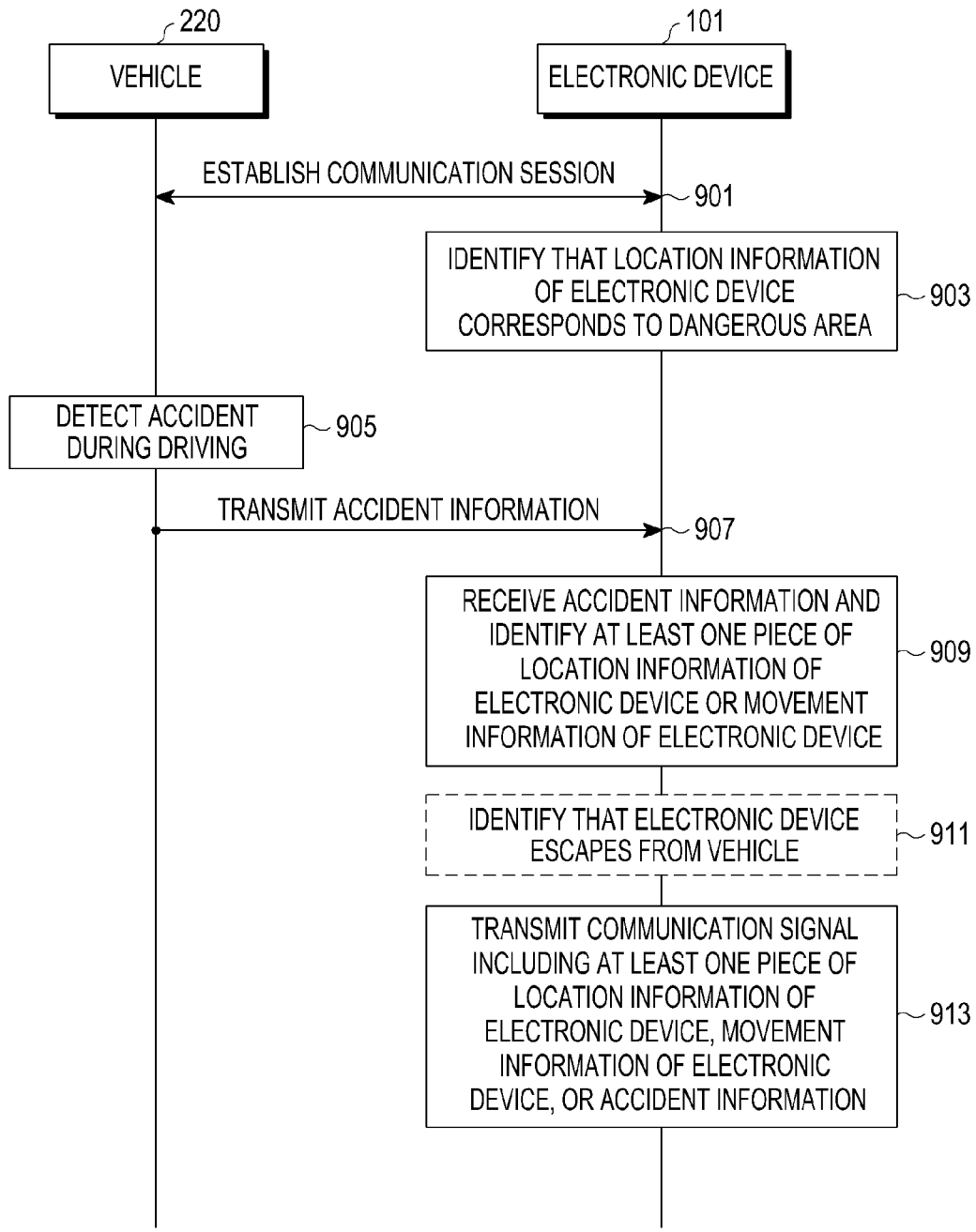
FIGS. 9A and 9B and FIGS. 10 and 11 are flowcharts illustrating the operation of an electronic device and a vehicle according to various embodiments of the present disclosure.
Figure 9B:
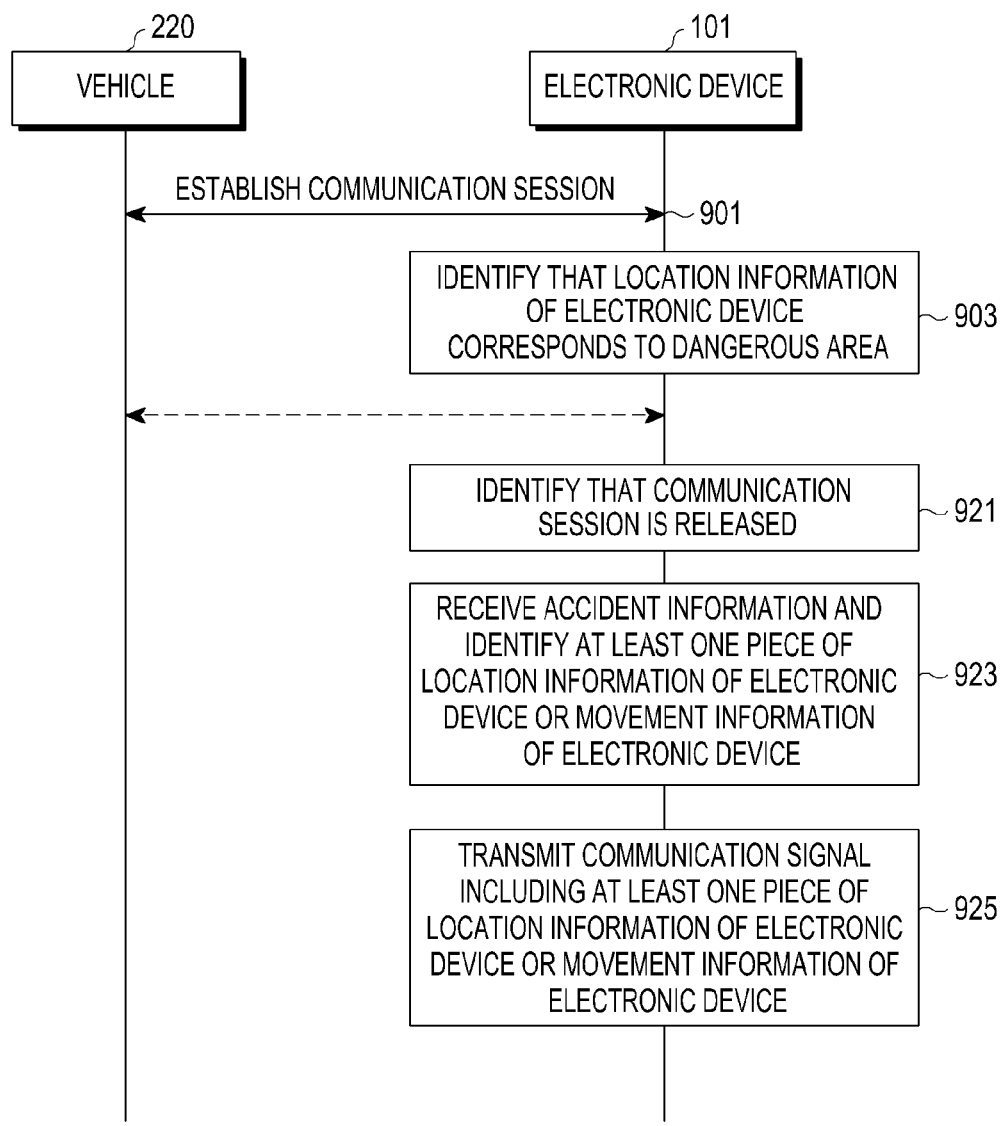

FIG. 9B is a flowchart illustrating the operation of an electronic device and a vehicle according to various embodiments of the present disclosure.

In operation 901, the electronic device 101 (for example, the processor 120, the AP 311, or the sensor hub 318) according to various embodiments of the present disclosure may form a communication session (for example, BLE connection) with the vehicle 220 through a communication module (for example, the communication module 190). In operation 903, the electronic device 101 may identify that current location information corresponds to the dangerous area. In operation 921, the electronic device 101 may identify that the communication session is released. For example, the user may be in the vehicle 220 and then move to the outside of the vehicle 220 due to an accident or breakdown. According to the movement of the user, the distance between the electronic device 101 and the vehicle 220 may be longer, and thus the communication session may be released. In operation 923, the electronic device 101 may identify at least one piece of current location information or movement information of the electronic device 101. In operation 925, the electronic device 101 may transmit a communication signal (for example, the communication signal including the PSM) including at least one piece of the current location information or the movement information of the electronic device 101.

Figure 10:
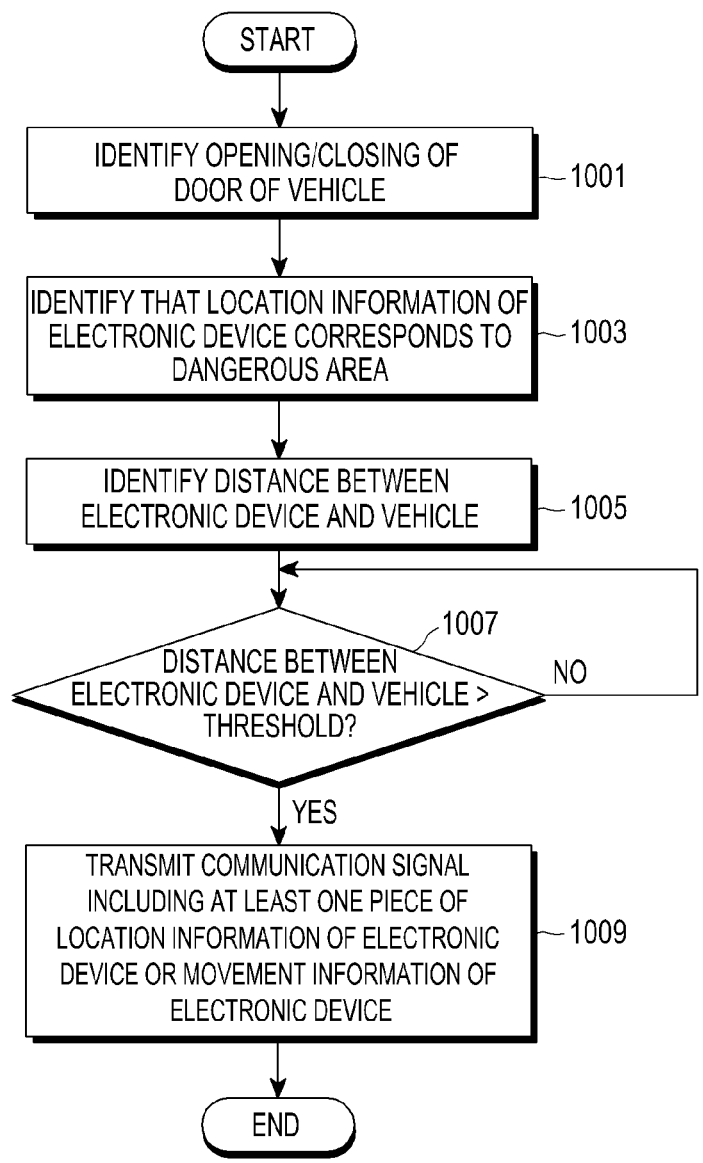

FIG. 10 is a flowchart illustrating the operation of an electronic device and a vehicle according to various embodiments of the present disclosure.

In operation 1001, the electronic device 101 (for example, the processor 120, the AP 311, or the sensor hub 318) according to various embodiments of the present disclosure may identify opening/closing of the door of the vehicle 220. For example, the electronic device 101 may configure information on opening/closing of the door as one of transmission conditions of the communication signal including the PSM. For example, the vehicle 220 may determine that a change in the open/closed state of the door in the case in which the engine is turned off is a boarding event of the user. Further, the vehicle 220 may determine that a later change in the open/closed state of the door is an exiting event of the user. The vehicle 220 may transmit the information on opening/closing of the door or the information on the exiting event of the user to the electronic device 101. As described above, the electronic device 101 may receive the information on opening/closing of the door and determine whether the user has exited the vehicle. In operation 1003, the electronic device 101 may identify that the current location corresponds to a dangerous area. In operation 1005, the electronic device 101 may identify the distance between the electronic device 101 and the vehicle 220. As described above, the electronic device 101 may directly measure the distance between the electronic device 101 and the vehicle 220 and receive information on the distance between the electronic device 101 and the vehicle 220 from the vehicle 220. In operation 1007, the electronic device 101 may determine whether the distance between the electronic device 101 and the vehicle 220 is larger than a threshold. When it is determined that the distance between the electronic device 101 and the vehicle 220 is larger than the threshold, the electronic device 101 may transmit a communication signal including at least one piece of movement information or location information of the electronic device 101.

Figure 11:
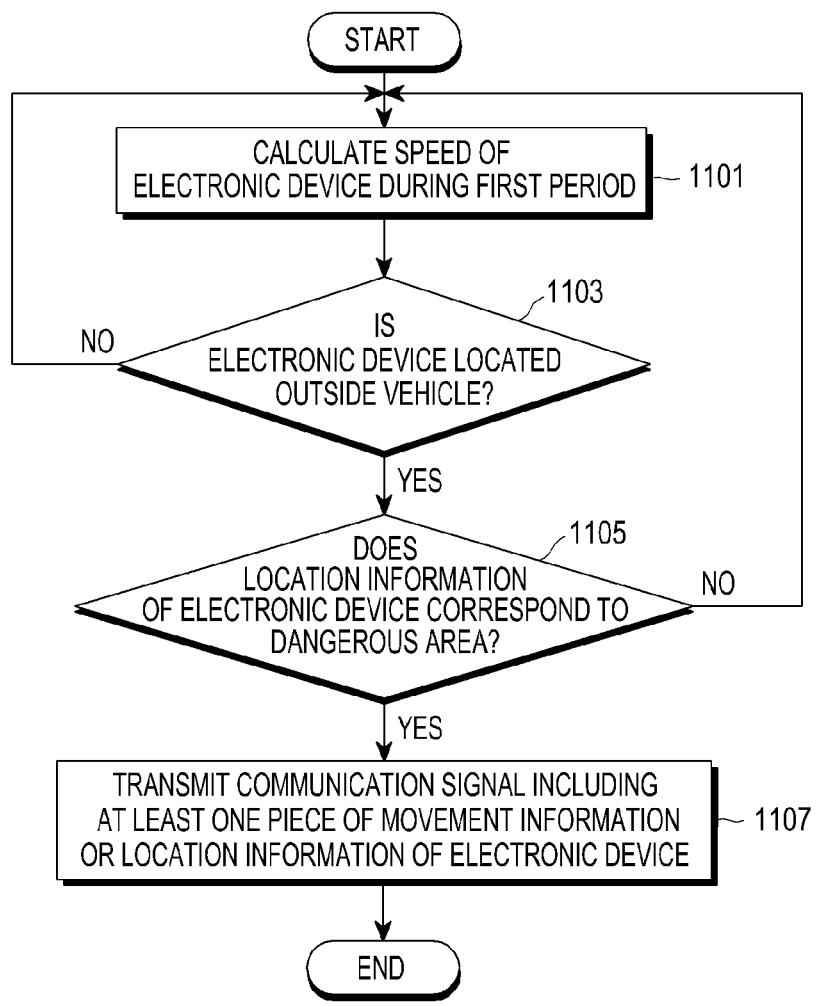

FIG. 11 is a flowchart illustrating the operation of an electronic device and a vehicle according to various embodiments of the present disclosure.

In operation 1101, the electronic device 101 (for example, the processor 120, the AP 311, or the sensor hub 318) according to various embodiments of the present disclosure may calculate the speed of the electronic device 101 during a first period. The electronic device 101 may calculate a speed during a particular period based on, for example, data from the acceleration sensor 319. In operation 1103, the electronic device 101 may determine whether the electronic device 101 is located outside the vehicle 220 based at least partially on the calculated speed. For example, when it is identified that the calculated speed is larger than a predetermined value, the electronic device 101 may determine that the electronic device 101 is being carried in the vehicle 220. When it is identified that the calculated speed is smaller than the predetermined value, the electronic device 101 may determine that the electronic device 101 is located outside the vehicle 220. The first period may be configured to be sufficiently long in consideration of congestion of traffic around the vehicle 220. According to another embodiment, the electronic device 101 may determine whether the electronic device 101 is located inside the vehicle 220 in consideration both of another vehicle having a speed different from the measured speed and of information received from the roadside BS. For example, the electronic device 101 may receive a communication signal including information on the speed of another vehicle from the other vehicle, or may receive a communication signal including information on the speed of another adjacent vehicle from the roadside BS 210. The electronic device 101 may compare the speed of the electronic device 101 with the speed of the other vehicle and determine whether the electronic device 101 is located inside the vehicle 220 based on the corresponding comparison result. For example, in a congestion situation, the speed not only of the vehicle but also of another vehicle may be smaller than a predetermined value. In this case, the electronic device 101 may not determine that the electronic device 101 is located outside the vehicle based on the fact that the speed of the electronic device 101 is smaller than the predetermined value. For example, when the speed of the other vehicle is also smaller than the predetermined value, the electronic device 101 may determine that the electronic device 101 is located inside the vehicle even when the speed of the electronic device 101 is smaller than or equal to the predetermined value. When it is determined that the electronic device 101 is located outside the vehicle 220, the electronic device 101 may determine whether current location information corresponds to a dangerous area in operation 1105. When it is determined that the location information of the electronic device 101 corresponds to a dangerous area, the electronic device 101 may transmit a communication signal including at least one piece of movement information or location information of the electronic device 101 in operation 1107.

Figure 12:
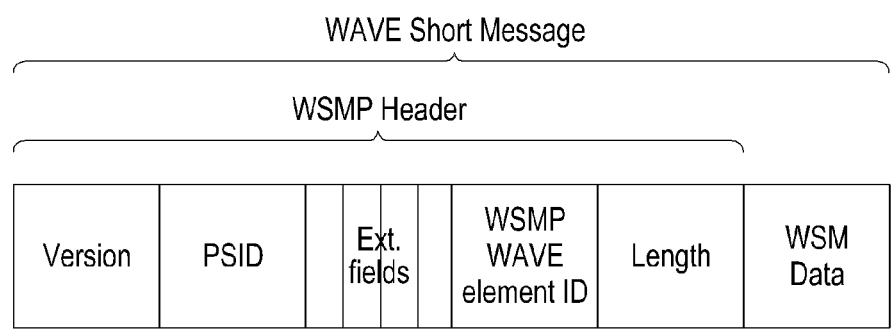
FIG. 12 illustrates the format of a communication signal according to various embodiments of the present disclosure.

FIG. 12 illustrates the format of a communication signal according to various embodiments of the present disclosure.

The electronic device 101 (for example, the processor 120, the AP 311, or the sensor hub 318) according to various embodiments of the present disclosure may transmit/receive a WAVE Short Message (WSM) illustrated in FIG. 12. For example, the electronic device 101 may transmit a WSM including the PSM or the BSM, or may receive a WSM including the PSM or the BSM. The WSM may include a Wave Short Message Protocol (WSMP) header, and the header may include version information, a Provider Service ID (PSID), an extended field, a WSMP WAVE element ID, information on a length, and WSM data. Further, the WSM may further include information on a channel number, a transmission rate, and transmission power.

Figure 13A:
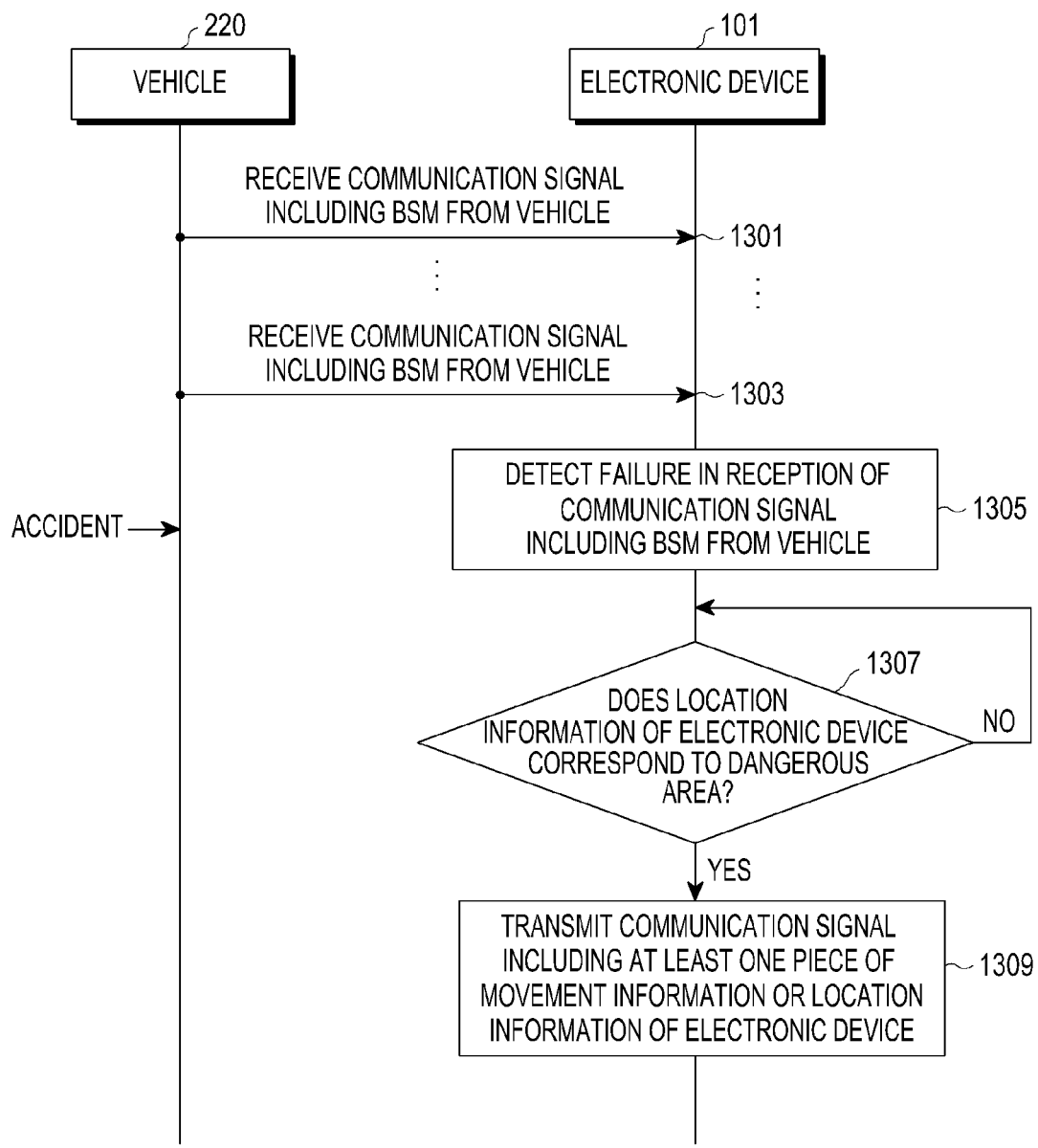
FIGS. 13A and 13B are flowcharts illustrating an operation method based on transmission/reception of a communication signal by an electronic device and a vehicle according to various embodiments of the present disclosure.
Figure 13B:
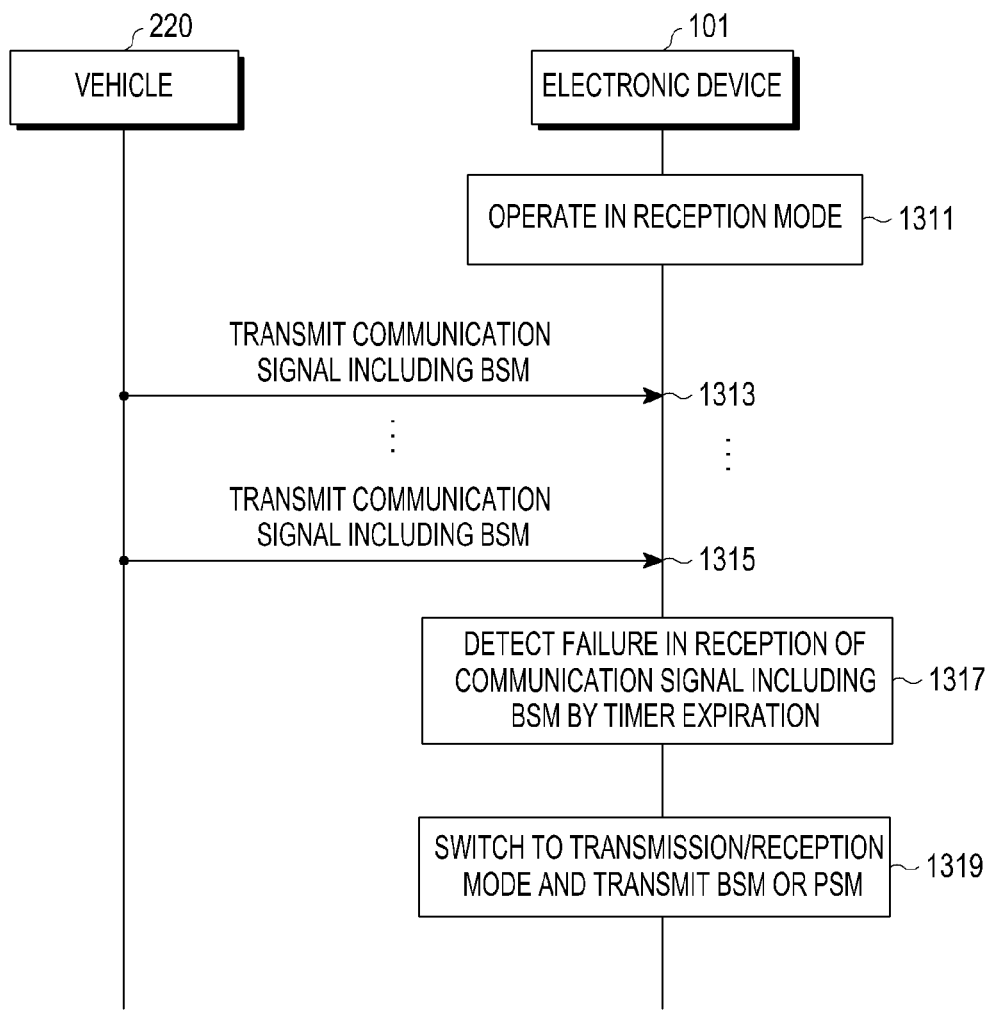

FIGS. 13A and 13B are flowcharts illustrating an operation method based on transmission/reception of a communication signal by an electronic device and a vehicle according to various embodiments of the present disclosure.

Referring to FIG. 13A, in operation 1301, the electronic device 101 (for example, the processor 120, the AP 311, or the sensor hub 318) according to various embodiments of the present disclosure may receive the communication signal including the BSM from the vehicle 220. For example, the vehicle 220 may include a communication module for WAVE, which can transmit the communication signal including the BSM, and may transmit the BSM including at least one piece of location information of the vehicle 220, movement information, size information, or identification information. In operation 1303, the electronic device 101 may receive the communication signal including the BSM from the vehicle 220. The vehicle 220 may transmit the BSM according to a predetermined period, and the electronic device 101 may receive the BSM on the predetermined period. When it is determined that the electronic device 101 is located inside the vehicle 220, the electronic device 101 may be configured not to transmit the PSM. For example, the electronic device 101 may compare the speed of the vehicle 220 included in the BSM with the speed of the electronic device 101. When the speed of the vehicle 220 included in the BSM is substantially the same as the speed of the electronic device 101, the electronic device 101 may determine that the electronic device 101 is located inside the vehicle 220 and thus not transmit the PSM. In operation 1305, the electronic device 101 may detect failure in reception of the communication signal including the BSM from the vehicle 220. For example, when the communication module for WAVE is damaged or does not work because the vehicle 220 is involved in an accident, the vehicle 220 may not transmit the BSM. For example, when the electronic device 101 does not receive the BSM from the vehicle 220 in which the electronic device 101 is located by an expiration time of a predetermined timer, the electronic device 101 may determine failure in reception of the communication signal. In operation 1307, the electronic device 101 may determine whether current location information corresponds to a dangerous area. When it is determined that the location information of the electronic device 101 corresponds to a dangerous area, the electronic device 101 may transmit a communication signal including at least one piece of movement information or location information of the electronic device 101 in operation 1309.

According to various embodiments of the present disclosure, the electronic device 101 may receive the BSM from the vehicle 220. For example, when the communication module for WAVE is not damaged even though an accident or breakdown occurs, the vehicle 220 may transmit the BSM, and in this case the speed of the vehicle 220 included in the BSM may be 0. The electronic device 101 may detect a speed of the electronic device 101 that exceeds a predetermined value while receiving the BSM including information indicating that the speed of the vehicle 220, which is determined to include the corresponding electronic device 101 therein, is 0. The predetermined value may be a speed that the user's movement cannot reach within the vehicle. When it is detected that the speed of the vehicle 220, which is determined to contain the electronic device 101 therein, is 0 and that the speed of the corresponding electronic device 101 is larger than or equal to the predetermined value, it may be determined that the electronic device 101 has moved to the outside of the vehicle 220. The electronic device 101 may determine whether the current location corresponds to a dangerous area and transmit the communication signal including the PSM according to the result.

Referring to FIG. 13B, in operation 1311, the electronic device 101 may operate in a reception mode. The vehicle 220 may transmit the communication signal including the BSM according to a predetermined period in operations 1313 and 1315. In operation 1317, the electronic device 101 may detect failure in reception of the communication signal including the BSM by timer expiration. When reception of the communication signal fails during a predetermined period, the electronic device 101 may switch to a transmission/reception mode and transmit the communication signal including the BSM or the PSM in operation 1319. The vehicle 220 may transmit the communication signal including the BSM to the electronic device 101 or transmit the communication signal based on short-range communication such as BLE to the electronic device 101. The vehicle 220 may detect an event related to the accident and transmit the communication signal including accident-related information to the electronic device 101 through WAVE communication or short-range communication in response to the event. When the current location information corresponds to a dangerous area, the electronic device 101 may transmit a communication signal including at least one piece of accident-related information (for example, at least one piece of information related to the location of the vehicle and information on the time point at which the accident occurs), movement information of the electronic device 101, or location information in a PSM form or a BSM form.

Figure 14A:
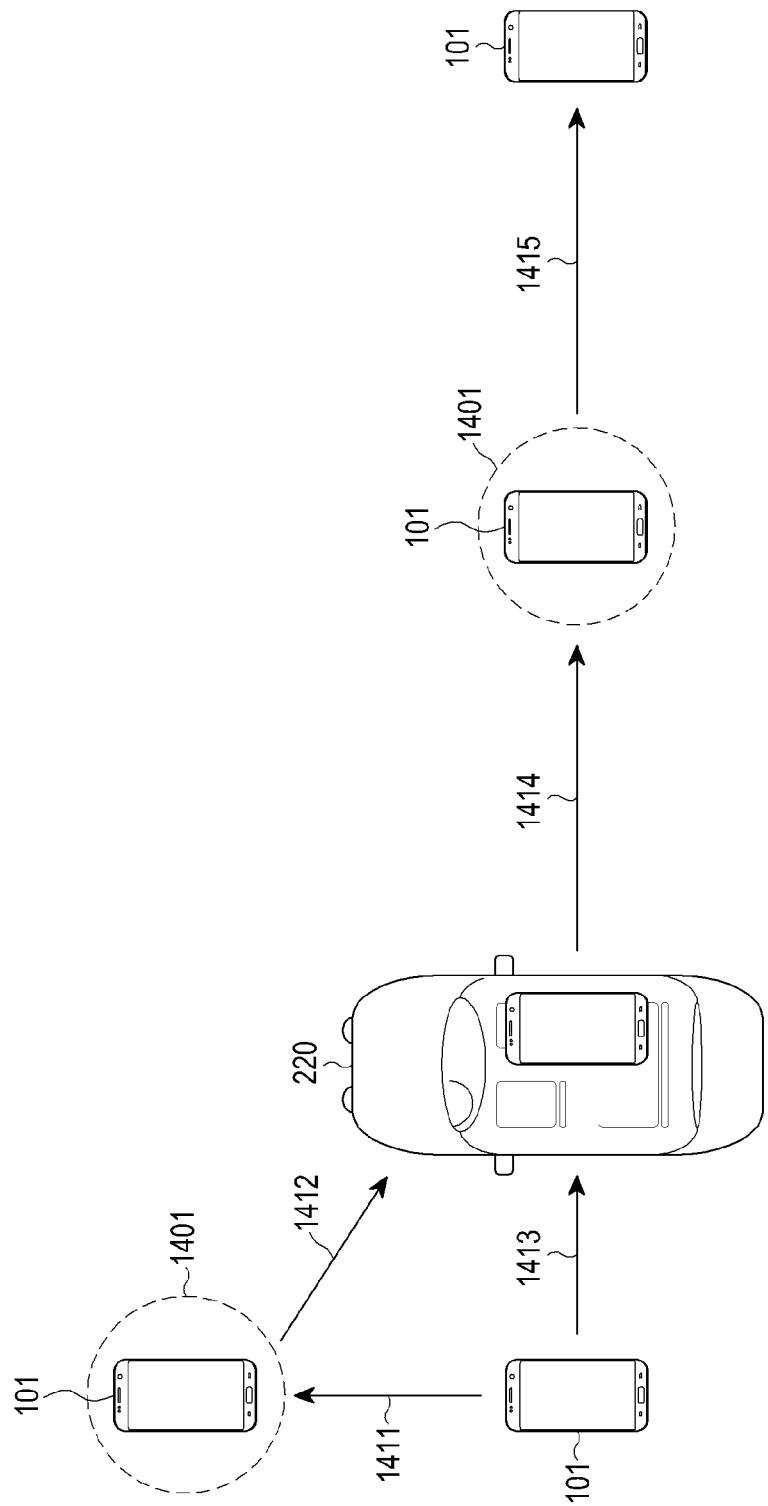
FIG. 14A illustrates state switching based on the location of an electronic device according to various embodiments of the present disclosure.

FIG. 14A illustrates state switching based on a location of an electronic device according to various embodiments of the present disclosure.

Referring to FIG. 14A, the electronic device 101 may be located outside the vehicle 220 while not being located in a dangerous area 1401. In this case, the electronic device 101 may operate in the PM and perform an operation of scanning for a communication signal including the PSM or a communication signal including the BSM according to the PM. The electronic device 101 may move to the dangerous area 1401 as indicated by reference numeral 1411 and, accordingly, may be located outside the vehicle 220 while being located inside the dangerous area 1401. In this case, the electronic device 101 may switch from the PM to the SW mode. Accordingly, the electronic device 101 may transmit the communication signal including the PSM and receive the communication signal including the BSM. The electronic device 101 may determine that the current user is walking according to the identified information and switch to the SW mode in response to the determination. The electronic device 101 may compare a database of the dangerous area stored inside the electronic device 101 with the current location and determine whether the electronic device 101 is located within the dangerous area 1401 according to the comparison result. Alternatively, when a reception rate (for example, the number of communication signals received per unit time) of the communication signal including the BSM is larger than a predetermined value, the electronic device 101 may determine that the electronic device 101 is located within the dangerous area 1401. Alternatively, the electronic device 101 may move to the inside of the vehicle 220 from the outside of the dangerous area 1401 as indicated by reference numeral 1413. The electronic device 101 may switch from the PM to the SD mode and transmit the BSM. For example, the electronic device 101 may detect entrance into the vehicle 220 and, when not receiving the communication signal including the BSM within a predetermined period, may switch to the SD mode. That is, when the vehicle 220 is not broken down and does not support WAVE communication, the electronic device 101 may switch to the SD mode. Alternatively, the electronic device 101 may move to the inside of the vehicle 220 from the inside of the dangerous area 1401 as indicated by reference numeral 1412. The electronic device 101 may switch from the SW mode to the SD mode. According to another embodiment, the electronic device 101 has received the communication signal including the BSM but may not receive the communication signal including the BSM during a predetermined period. In this case, the electronic device 101 may determine that the vehicle 220 is broken down and, when the vehicle 220 supports communication, may transmit/receive the communication signal including the BSM by switching to the SD mode. When the electronic device 101 receives accident information from the vehicle 220, the electronic device 101 may transmit a communication signal including the accident information. According to another embodiment, inside the vehicle 220, the electronic device 101 may periodically receive the communication signal including the BSM. Based on periodic reception of the communication signal including the BSM, the electronic device 101 may switch from the SW mode to the PM or maintain the PM.

According to various embodiments of the present disclosure, the electronic device 101 may escape from the vehicle 220 and enter the dangerous area 1401. When it is determined that the vehicle 220 is not broken down and does not support WAVE communication, the electronic device 101 may enter the SDW mode from the SD mode and transmit/receive the communication signal including the PSM and the communication signal including the BSM. According to another embodiment, when it is determined that the vehicle 220 is broken down and supports WAVE communication, the electronic device 101 may enter the SDW mode from the SD mode and transmit/receive the communication signal including the PSM and the communication signal including the BSM. According to another embodiment, when it is determined that the vehicle 220 is not broken down and supports WAVE communication, the electronic device 101 may switch from the PM to the SW mode, and may receive the communication signal including the BSM and transmit the communication signal including the PSM. In this case, the vehicle 220 may transmit the communication signal including the BSM. Meanwhile, although not illustrated, the electronic device 101 may escape from the vehicle 220 and enter the outside of the dangerous area 1401. The electronic device 101 may switch from the SD mode to the PM or maintain the PM, and may scan for the communication signal including the BSM or the communication signal including the PSM.

According to various embodiments of the present disclosure, the electronic device 101 may move to escape from the dangerous area 1401 as indicated by reference numeral 1415. When the vehicle 220 is not broken down and does not support WAVE communication, the electronic device 101 may switch from the SDW mode or the SW mode to the PM. The electronic device 101 may determine whether the electronic device 101 escapes from the dangerous area 1401 according to direct input such as a touch or user input such as voice input. Alternatively, the electronic device 101 may compare the database of the dangerous area stored within the electronic device 101 with the current location of the electronic device 101 and determine whether the electronic device 101 escapes from the dangerous area 1401 according to the comparison result. The electronic device 101 may determine an activity state (a state of walking or running) through identified information and automatically switch between the respective modes.

Figure 14B:
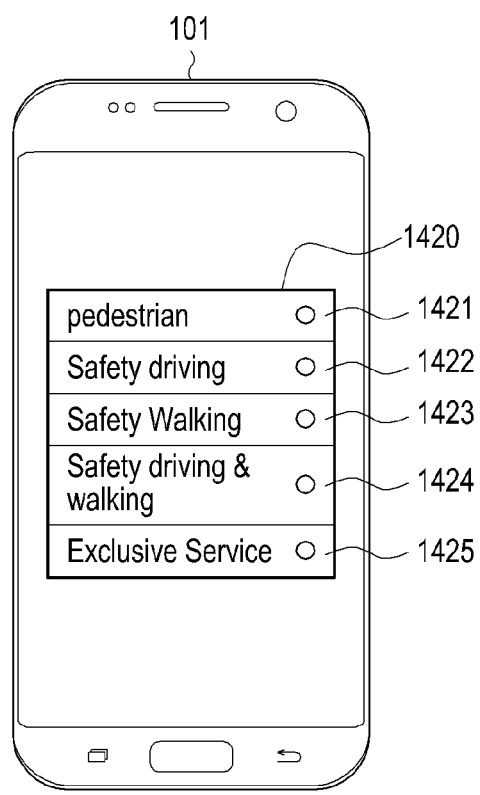
FIG. 14B illustrates a graphic object (for example, a Graphic User Interface (GUI)) of each mode of an electronic device according to various embodiments of the present disclosure.

FIG. 14B illustrates a user interface for each mode of an electronic device according to various embodiments of the present disclosure.

Referring to FIG. 14B, the electronic device 101 according to various embodiments of the present disclosure may display a user interface 1420 that may enable selection of a V2X mode. The user interface 1420 may include a pedestrian selection menu 1421, a safe-driving selection menu 1422, a safe-walking selection menu 1423, a safe-driving-and-safe-walking selection menu 1424, and an exclusive service selection menu 1425. When the pedestrian selection menu 1421 is selected, the electronic device 101 may scan for the communication signal from the roadside BS 210 or the vehicle 220. When the safe-driving selection menu 1422 is selected, the electronic device 101 may transmit the communication signal including the BSM and scan for the communication signal from an adjacent area. The electronic device 101 may generate the BSM including at least one piece of information on the measured location, speed, or direction and information (for example, identification information or information on the size) received from the vehicle 220 and transmit the generated BSM. For example, the user may board a vehicle that does not support WAVE communication while carrying the electronic device 101. In this case, instead of the vehicle, the electronic device 101 may generate the BSM of the vehicle and transmit the generated BSM. When the electronic device 101 is located inside the vehicle, at least one of the location, speed, or direction of the electronic device 101 may be substantially the same as at least one the location, speed, or direction of the vehicle. Accordingly, the electronic device 101 may insert the directly identified information into a data field of the part of the BSM and transmit the BSM. According to various embodiments of the present disclosure, information on the vehicle (for example, identification information or information on the size thereof) may be received through communication with the vehicle or acquired by user input. When the safe-walking selection menu 1424 is selected, the electronic device 101 may transmit the PSM and scan for the communication signal from an adjacent area. When the safe-driving-and-safe-walking selection menu 1425 is selected, the electronic device 101 may transmit the BSM and the PSM and scan for the communication signal from an adjacent area. When the exclusive service selection menu 1425 is selected, the electronic device 101 may provide, for example, various exclusive services such as access to a traffic-related webpage, calling an ambulance, making an emergency call, and making a call to an insurance company. As described above, even when the user gets in a vehicle that does not support the V2X communication function, the electronic device 101 carried by the user may operate as the OBU.

Figure 15A:
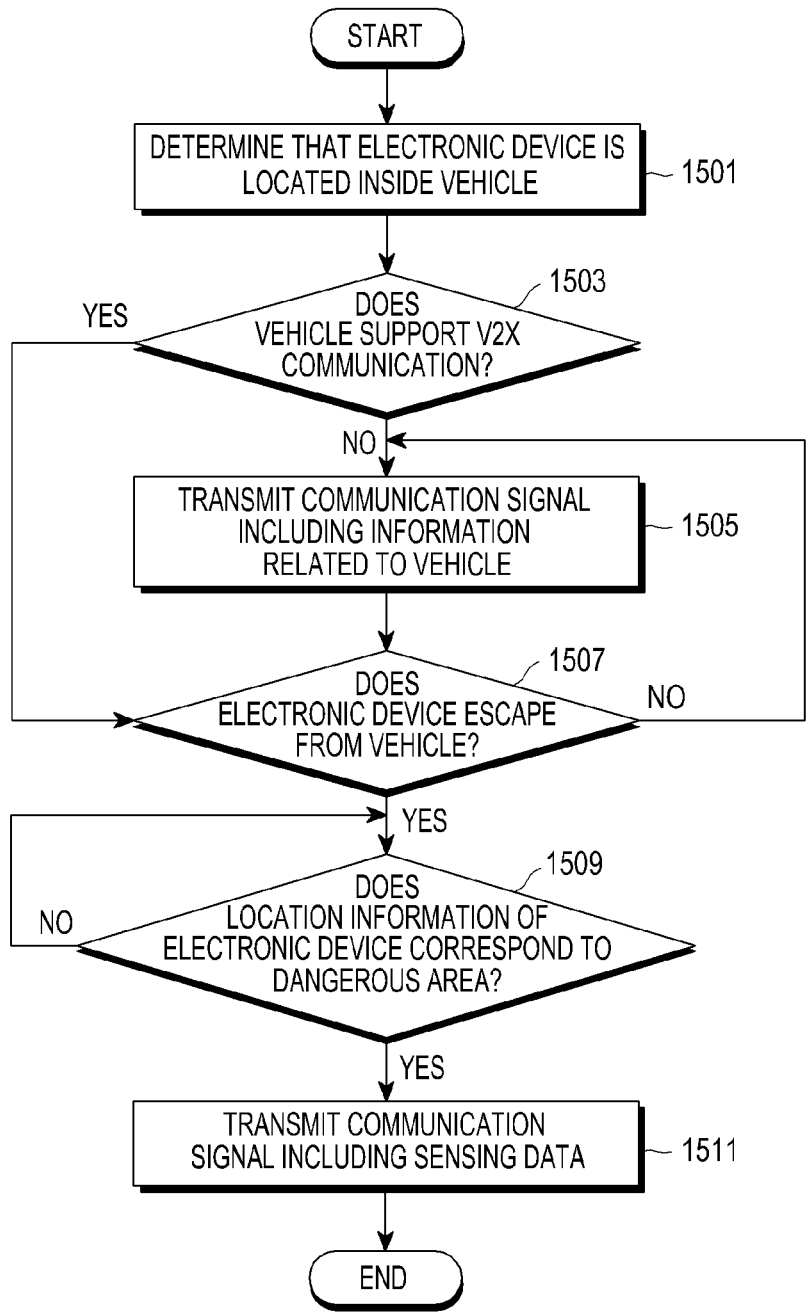
FIG. 15A is a flowchart illustrating an operation method of an electronic device located inside a vehicle according to various embodiments of the present disclosure.

FIG. 15A is a flowchart illustrating an operation method of an electronic device located inside a vehicle according to various embodiments of the present disclosure.

In operation 1501, the electronic device 101 (for example, the processor 120, the AP 311, or the sensor hub 318) according to various embodiments of the present disclosure may determine that the electronic device 101 is located inside the vehicle 220. In operation 1503, the electronic device 101 may determine whether the vehicle 220 supports V2X communication. For example, the electronic device 101 may scan whether the communication signal including the BSM is received from the vehicle 220 and recognize whether the vehicle 220 supports V2X communication according to the scan result. When the vehicle 220 does not support V2X communication, the electronic device 101 may transmit a communication signal including information associated with the vehicle 220 in operation 1505. For example, the electronic device 101 may transmit the communication signal including the BSM and operate like the OBU of the vehicle 220. In operation 1507, the electronic device 101 may determine whether the electronic device 101 is located outside the vehicle 220. When it is not determined that the electronic device 101 is located outside the vehicle 220, the electronic device 101 may transmit the communication signal including the BSM. When it is determined that the electronic device 101 is located outside the vehicle 220, the electronic device 101 may determine whether current location information corresponds to the dangerous area in operation 1509. When it is determined that the location information of the electronic device 101 corresponds to the dangerous area, the electronic device 101 may transmit the communication including sensing data, for example, the communication signal including the PSM, in operation 1511. For example, the electronic device 101 may identify or determine information included in the PSM and transmit the communication signal including the PSM. As described above, the electronic device 101 according to various embodiments may transmit the communication signal including the BSM and then transmit the communication signal including the PSM. Further, the electronic device 101 may transmit the communication signal including the PSM and then transmit the communication signal including the BSM. For example, when it is determined that the electronic device 101 is located inside the vehicle 220 and it is identified that the vehicle 220 does not support V2X, the electronic device 101 may transmit the communication signal including the BSM.

Figure 15B:
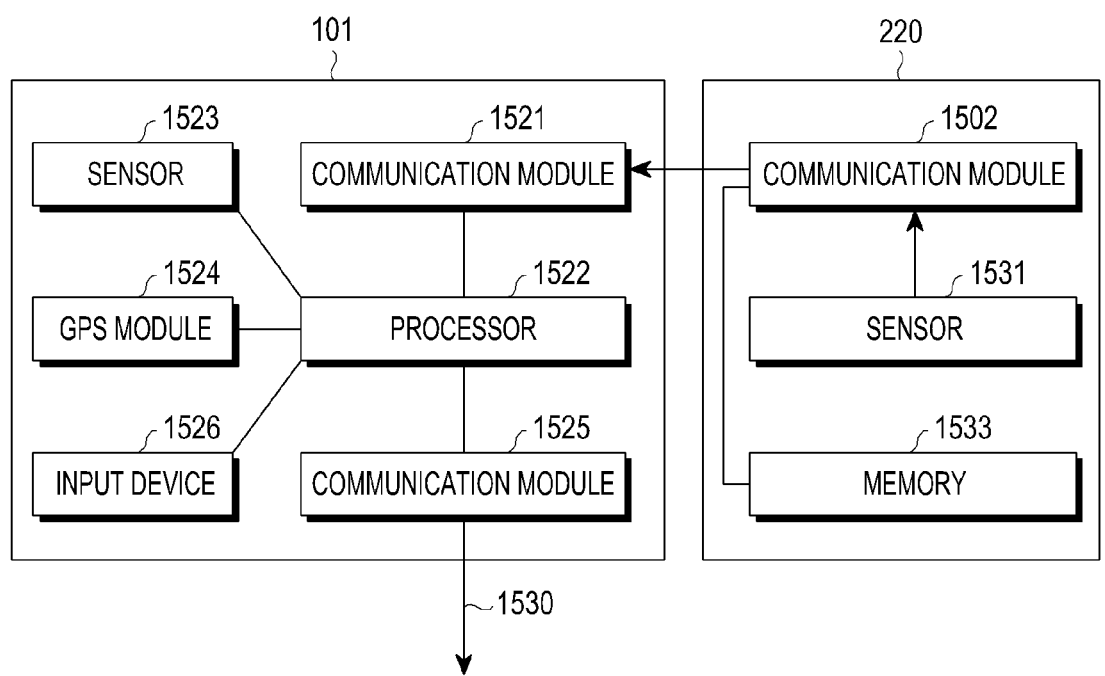
FIG. 15B is a block diagram illustrating an electronic device and a vehicle according to various embodiments of the present disclosure.

FIG. 15B is a block diagram illustrating an electronic device and a vehicle according to various embodiments of the present disclosure.

The electronic device 101 may include a communication module 1521 (for example, a short-range communication module), a processor 1522 (for example, the processor 120, the AP 311, or the sensor hub 318), a sensor 1523 (for example, the sensor module 176, the acceleration sensor 319, the gyro sensor 320, or the geomagnetic field sensor 321), a GPS module 1524 (for example, the GPS module 331), an input device 1526 (for example, the input device 150 or a touch circuitry of the display device 160), and a communication module 1525 (for example, the integrated module 335 or the vehicle communication module 341). The vehicle 220 may include a sensor 1531, a communication module 1502 (for example, a short-range communication module), and a memory 1533. The processor 1522 may identify that the electronic device 101 is located inside the vehicle 220, which does not support V2X communication, and operate as the OBU to determine transmission of the communication signal including the BSM. The processor 1522 may acquire movement information of the electronic device 101 from the sensor 1523. As described above, when the electronic device 101 is located inside the vehicle 220, the movement information of the electronic device 101 is substantially the same as the movement information of the vehicle 220, so that the electronic device 101 may insert the movement information of the electronic device 101 into the BSM of the movement information of the vehicle 220. Alternatively, the electronic device 101 may acquire information on the vehicle 220 from the communication module 1502 of the vehicle 220 through the communication module 1521. For example, the electronic device 101 may receive location information or movement information of the vehicle 220. Alternatively, the electronic device 101 may receive data sensed by the sensor 1531 including a sensor for sensing a braking state of the vehicle 220 and a wheel steering angle sensor. The vehicle 220 may transmit information (for example, identification information of the vehicle 220 or size information of the vehicle 220) stored in the memory 1533 to the electronic device 101 through the communication module 1502. The processor 1522 may generate a communication signal 1530 including the BSM based on at least one piece of information acquired through the sensor 1523, information acquired through the GSP module 1524, or information received from the vehicle 220. The processor 1522 may transmit the generated communication signal 1530 including the BSM to another vehicle or the roadside BS through the communication module 1525. When the processor 1522 detects that a predetermined condition such as escape of the electronic device 101 from the vehicle 220 is satisfied, the processor 1522 may stop transmitting the communication signal 1530 including the BSM and transmit the communication signal including the PSM.

Figure 16:
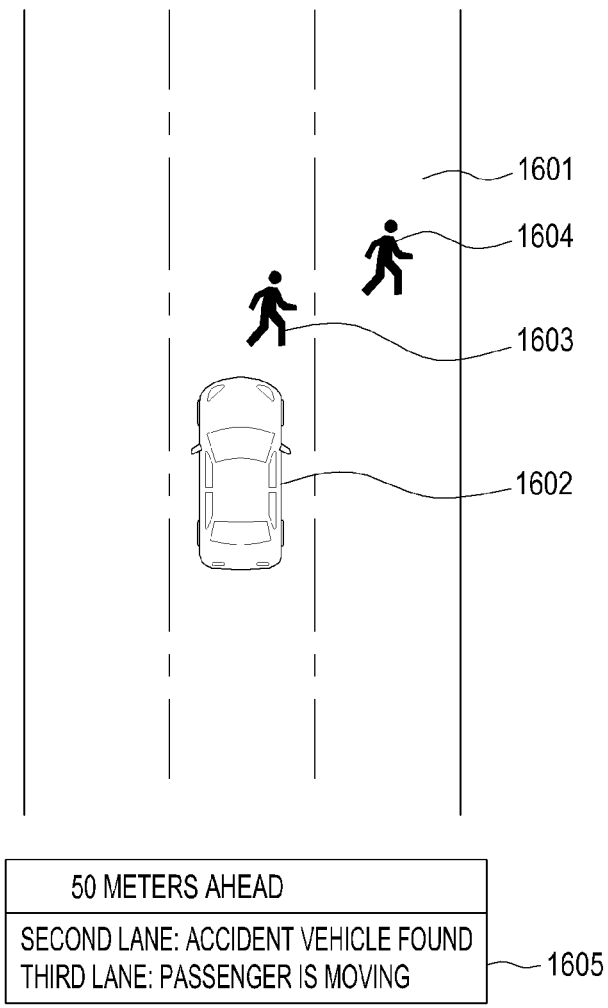
FIG. 16 illustrates graphic objects displayed in a vehicle according to various embodiments of the present disclosure.

FIG. 16 illustrates graphic objects displayed in a vehicle according to various embodiments of the present disclosure.

According to various embodiments of the present disclosure, the vehicle 220 may receive a communication signal associated with pedestrian safety from the electronic device 101. The vehicle 220 may receive, for example, a communication signal including the PSM, and the PSM may include the location of the electronic device 101, information on movement of the electronic device 101, and information on the vehicle in which the electronic device 101 is located. The vehicle 220 may display the graphic object illustrated in FIG. 16 based at least partially on information included in the received communication signal. The graphic object may include a graphic object 1602 of the vehicle in which the electronic device 101 is located on a graphic object 1601 corresponding to a road having three lanes. The vehicle 220 may display the graphic object 1602 of the vehicle in which the electronic device 101 is located at one position on the graphic object 1601 corresponding to the road including three lanes based at least partially on location information of the vehicle, in which the electronic device 101 is located, included in the PSM. The vehicle 220 may display a graphic object 1603 corresponding to a pedestrian at the current location and a graphic object 1604 corresponding to an expected position of the pedestrian on the graphic object 1601 corresponding to the road including three lanes based on at least one piece of the received location information or movement information of the electronic device 101. The vehicle 220 may display text 1605 including information on a distance to an accident site (that is, a stoppage site) or an explanation of movement of the pedestrian based at least partially on the current location of the vehicle 220, information associated with the received location, and information on the movement. By displaying the graphic objects as illustrated in FIG. 16, the vehicle 220 may induce a driver to drive safely or control a current driving state according to the received information. For example, when the stopped vehicle and the pedestrian are located in the second lane and it is expected that the pedestrian will move to the third lane, the vehicle 220 may perform control to change the driving lane to the first lane. Although not illustrated, the vehicle 220 may further display graphic objects on other pieces of information included in the PSM. For example, when the PSM includes a group or information on the group, the vehicle 220 may display a graphic object for the group on the graphic object 1601 for the road including three lanes according to the size of the group.

FIGS. 17A to 17D illustrate graphic objects for the operation of each mode of an electronic device according to various embodiments of the present disclosure.

Figure 17A:
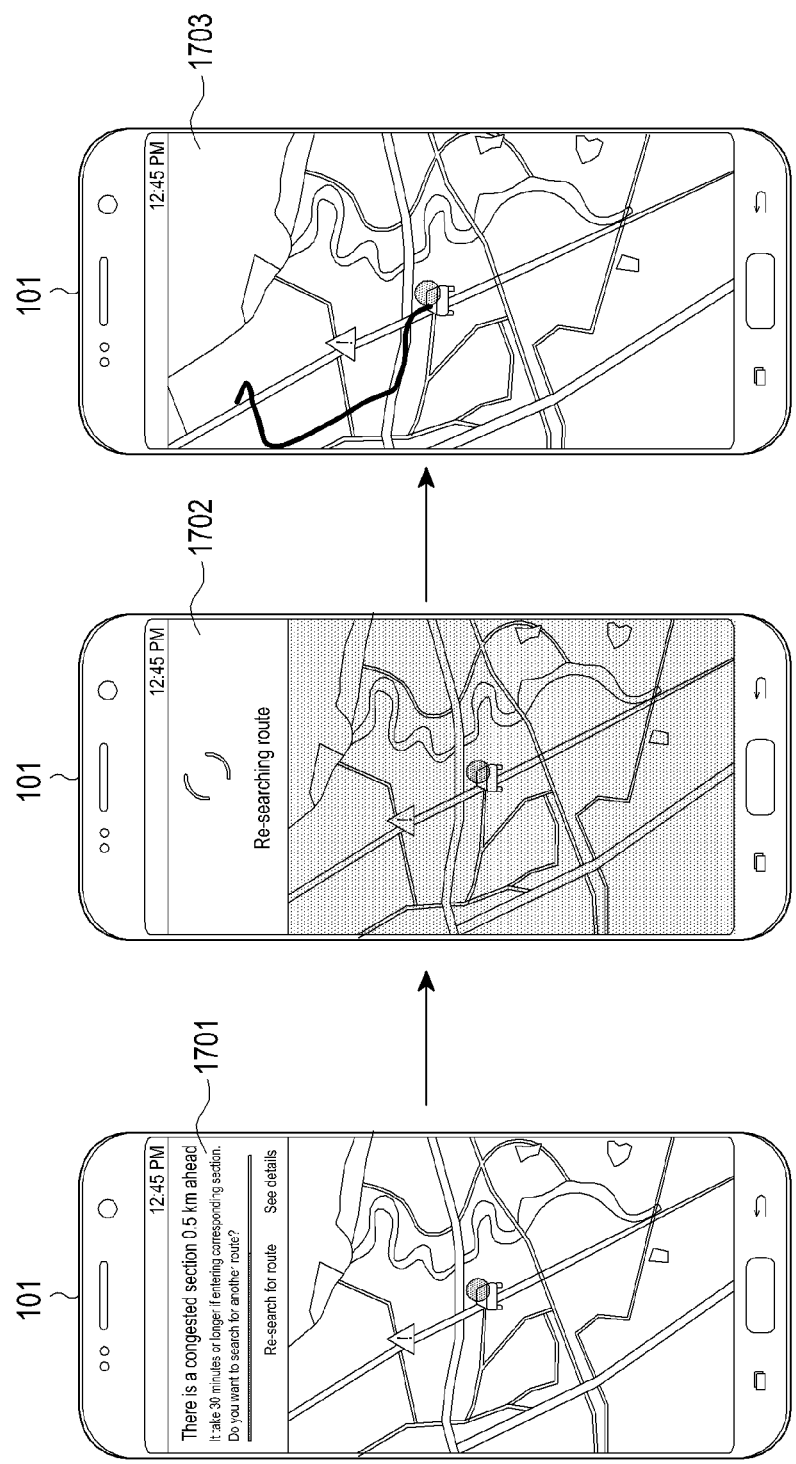
FIGS. 17A to 17D illustrate graphic objects for the operation of each mode of an electronic device according to various embodiments of the present disclosure.

In the embodiment of FIG. 17A, the electronic device 101 (for example, the processor 120, the AP 311, or the sensor hub 318) may receive a communication signal including the PSM from another electronic device and determine information on an accident site. The electronic device 101 may output the information on the accident site on a screen of an executed navigation application, and the navigation application may display a graphic object 1701 including the information on the corresponding accident site. The graphic object 1701 may include a message that inquires about a detour route search along with the information on the accident site. When a request for searching for the detour route is made by the user, the electronic device 101 may display a graphic object 1702 that indicates route searching. When the route search is completed, the electronic device 101 may display a graphic object 1703 including the detour route.

Figure 17B:
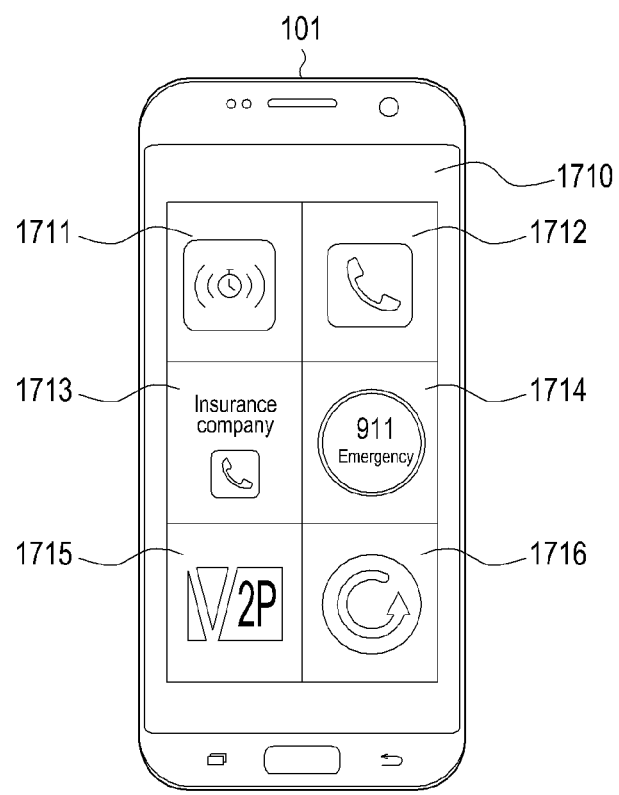

In the embodiment of FIG. 17B, the electronic device 101 (for example, the processor 120, the AP 311, or the sensor hub 318) may display a graphic object 1710 corresponding to an emergency mode according to a change to a mode in which the communication signal including the PSM is transmitted, that is, the emergency mode. The graphic object 1710 corresponding to the emergency mode may include a notification sound activation/deactivation icon 1711, a phone application execution icon 1712, an icon 1713 for making a call to an insurance company, an icon 1714 for making a call to an emergency service number, an icon 1715 for activating/deactivating transmission of a communication signal including a PSM, or a mode-switching icon 1716. When the notification sound activation/deactivation icon 1711 is selected, the electronic device 101 may output a notification sound through an audio module (for example, the audio module 170) or stop outputting the notification sound. When the phone application execution icon 1712 is selected, the electronic device 101 may execute a phone application and display a phone application execution screen. When the icon 1713 for making a call to an insurance company is selected, the electronic device 101 may execute the phone application and make a call to an insurance company. When the icon 1714 for making a call to an emergency service number is selected, the electronic device 101 may make a call to the emergency service number after executing the phone application. When the icon 1715 for activating/deactivating transmission of a communication signal including a PSM is selected, the electronic device 101 may transmit the communication signal including the PSM or stop transmitting the communication signal including the PSM. When the mode-switching icon 1716 is selected, the electronic device 101 may release an emergency mode and display a general menu screen.

Figure 17C:
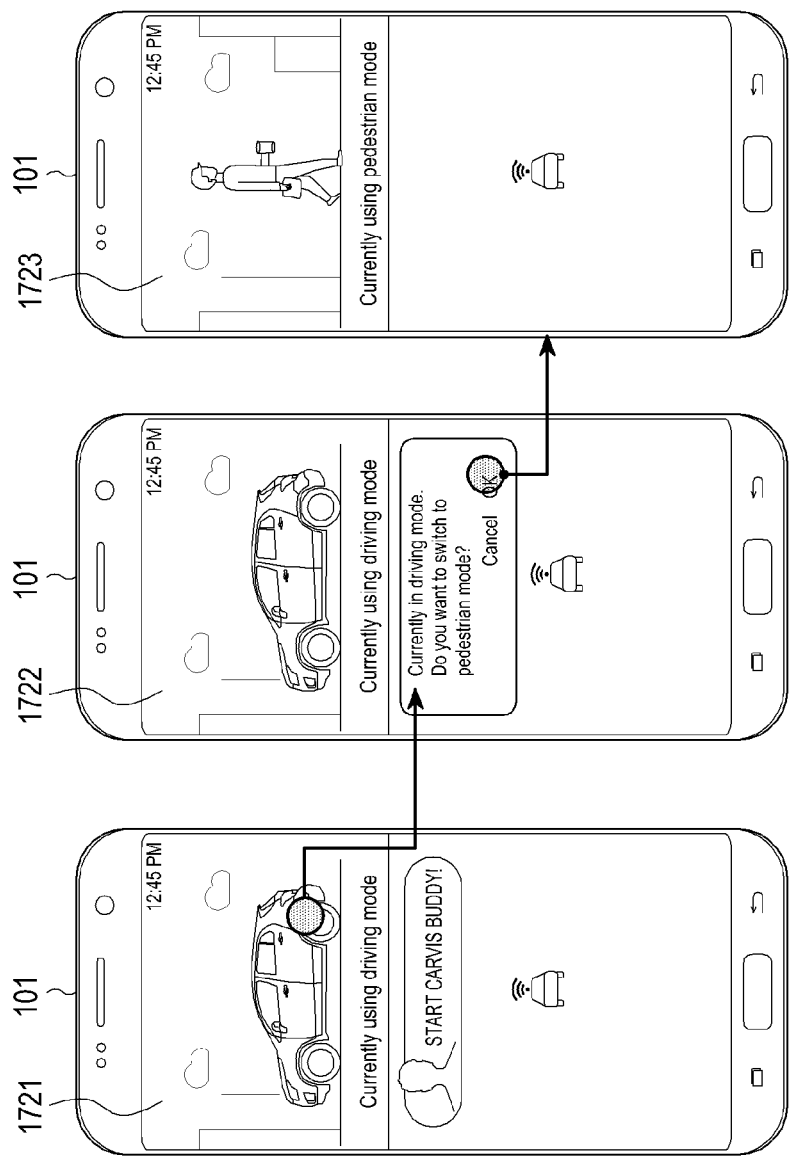

In the embodiment of FIG. 17C, the electronic device 101 (for example, the processor 120, the AP 311, or the sensor hub 318) may switch from a driving mode to a pedestrian mode according to user input. The electronic device 101 may display a graphic object 1721 corresponding to the driving mode. When selection for at least one position of the graphic object 1721 is detected, the electronic device 101 may display a graphic object 1722 that inquires about whether to change the mode. When a request for changing the mode is input through the graphic object 1722, the electronic device 101 may switch from the driving mode to the pedestrian mode and display a graphic object 1723 corresponding to the pedestrian mode. According to the mode switching, the electronic device 101 may transmit the communication signal including the BSM and then transmit the communication signal including the PSM. According to various embodiments of the present disclosure, the electronic device 101 may switch the mode based on various user input, such as a voice command and a screen touch.

Figure 17D:
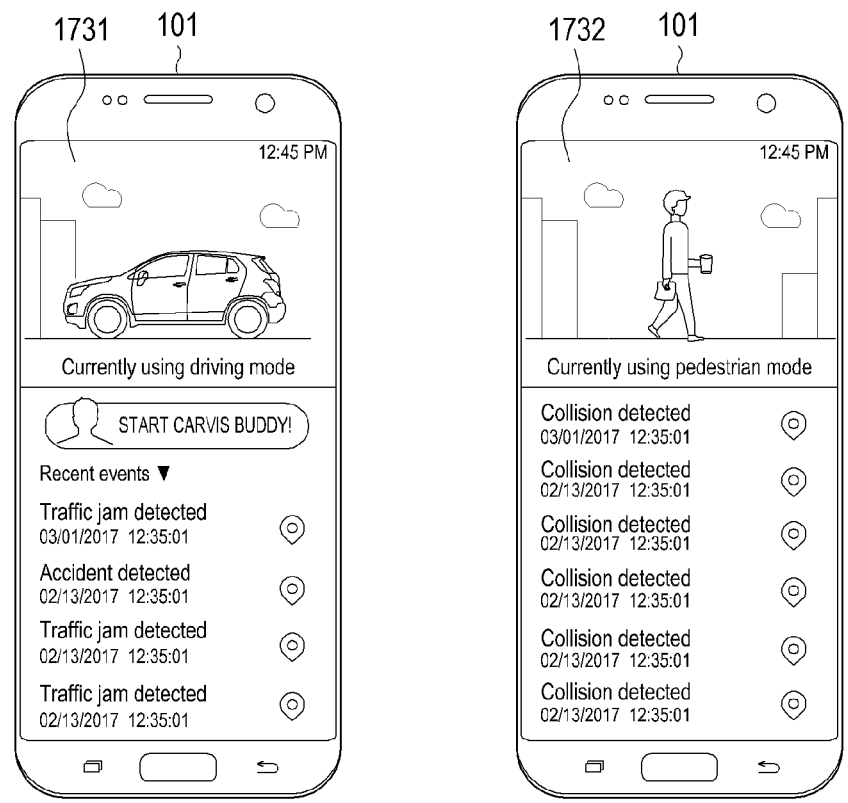

In the embodiment of FIG. 17D, the electronic device 101 (for example, the processor 120, the AP 311, or the sensor hub 318) may display a graphic object 1731 corresponding to the driving mode. The graphic object 1731 corresponding to the driving mode may include a detection history of recently detected events (for example, traffic congestion and accidents). The electronic device 101 may display a graphic object 1732 corresponding to the pedestrian mode according to mode switching. The graphic object 1732 corresponding to the pedestrian mode may include a detection history of recently detected events (for example, collision in the vicinity).

Figure 18:
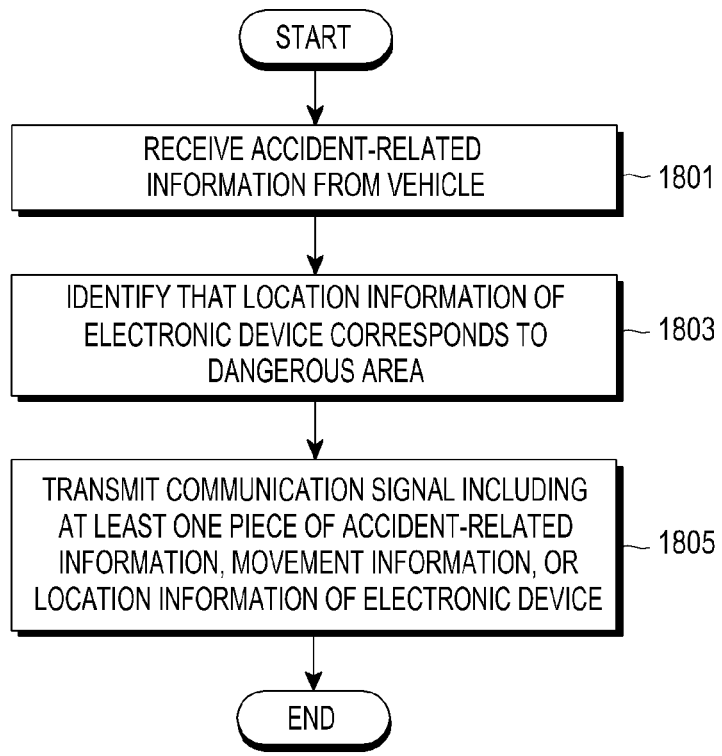
FIG. 18 is a flowchart illustrating an operation method of an electronic device receiving accident information according to various embodiments of the present disclosure.

FIG. 18 is a flowchart illustrating an operation method of an electronic device receiving accident information according to various embodiments of the present disclosure.

In operation 1801, the electronic device 101 (for example, the processor 120, the AP 311, or the sensor hub 318) according to various embodiments of the present disclosure may receive accident-related information (or breakdown-related information) from the vehicle 220. For example, the vehicle 220 may transmit the communication signal including the BSM to the electronic device 101 or transmit the communication signal based on short-range communication such as BLE to the electronic device 101. The vehicle 220 may detect an event related to the accident and transmit the communication signal including accident-related information to the electronic device 101 through WAVE communication or short-range communication in response to the event. In operation 1803, the electronic device 101 may identify that current location information corresponds to a dangerous area. In response to the reception of the accident-related information and the location information corresponding to the dangerous area, the electronic device 101 may transmit the communication signal including at least one piece of accident-relate information (for example, at least one piece of information related to the location of the vehicle 220 or information on an accident site), movement information of the electronic device 101 or location information of the electronic device 101. Accordingly, even when a person riding in the vehicle 220 cannot escape from the corresponding vehicle 220 after the vehicle 220 is involved in an accident, the electronic device 101 may transmit the communication signal including the PSM.

Figure 19:
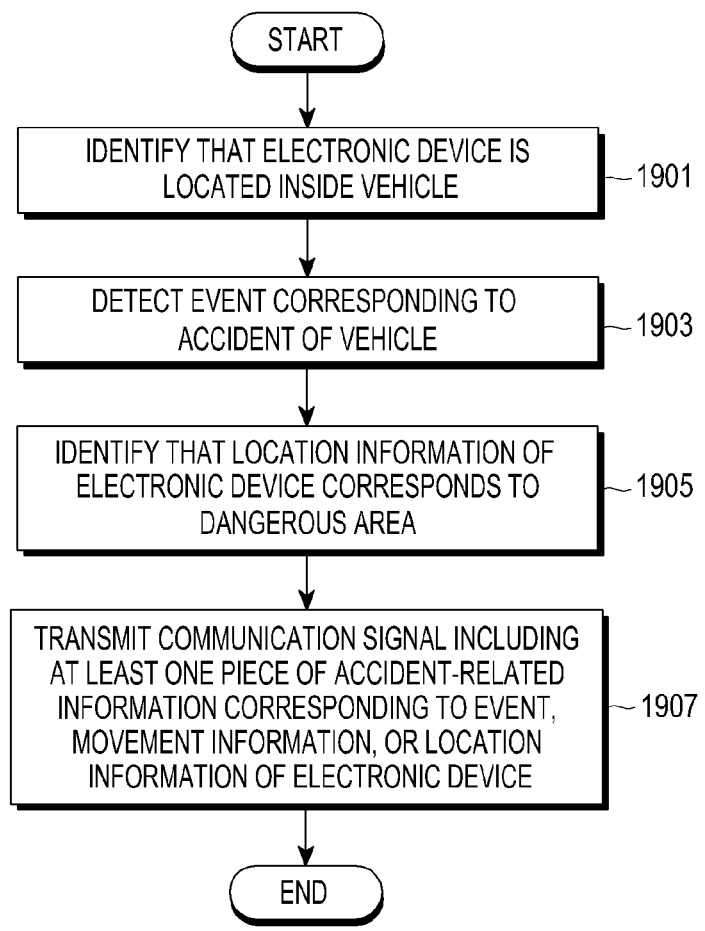
FIG. 19 is a flowchart illustrating an operation method of an electronic device located inside a vehicle in a predetermined dangerous area according to various embodiments of the present disclosure.

FIG. 19 is a flowchart illustrating an operation method of an electronic device located inside a vehicle in a predetermined dangerous area according to various embodiments of the present disclosure.

In operation 1901, the electronic device 101 (for example, the processor 120, the AP 311, or the sensor hub 318) according to various embodiments of the present disclosure may identify that the electronic device 101 is located inside the vehicle 220. The vehicle 220 may not include a communication module. The electronic device 101 may determine that the electronic device 101 is located inside the vehicle 220 without communication with the vehicle 220. For example, the electronic device 101 may measure the speed of the electronic device 101 during a particular period and determine whether the electronic device 101 is moved by the vehicle 220 according to whether an average speed is larger than a predetermined value. In operation 1903, the electronic device 101 may detect an event corresponding to an accident of the vehicle 220. When it is determined that the speed of the electronic device 101 for the particular period is smaller than or equal to the predetermined value, the electronic device 101 may determine that the vehicle 220 has been in an accident. When it is determined that, for example, the acceleration exceeds a predetermined value, the electronic device 101 may determine that the vehicle 220 has been in an accident. For example, by comparing the speed of another vehicle with the speed of the electronic device 101, the electronic device 101 may determine whether the vehicle 220 has been in an accident. The electronic device 101 may receive the communication signal including the BSM from another vehicle, or may receive information on the speed of another vehicle driving near the electronic device 101 from the roadside BS. When it is determined that the difference between the speed of the electronic device 101 and the speed of the other vehicle is larger than a predetermined value, the electronic device 101 may determine that the vehicle 220 in which the electronic device 101 is located has been in an accident. In operation 1905, the electronic device 101 may determine that the current location information corresponds to the dangerous area. In operation 1907, the electronic device 101 may transmit the communication signal including at least one piece of accident-related information corresponding to an event, movement information of the electronic device 101 or location information of the electronic device 101. As described above, even when the vehicle 220 in which the electronic device 101 is located does not support communication and the person, who gets in the vehicle 220, cannot escape from the vehicle 220, the electronic device 101 may transmit the communication signal including the PSM.

Figure 20:
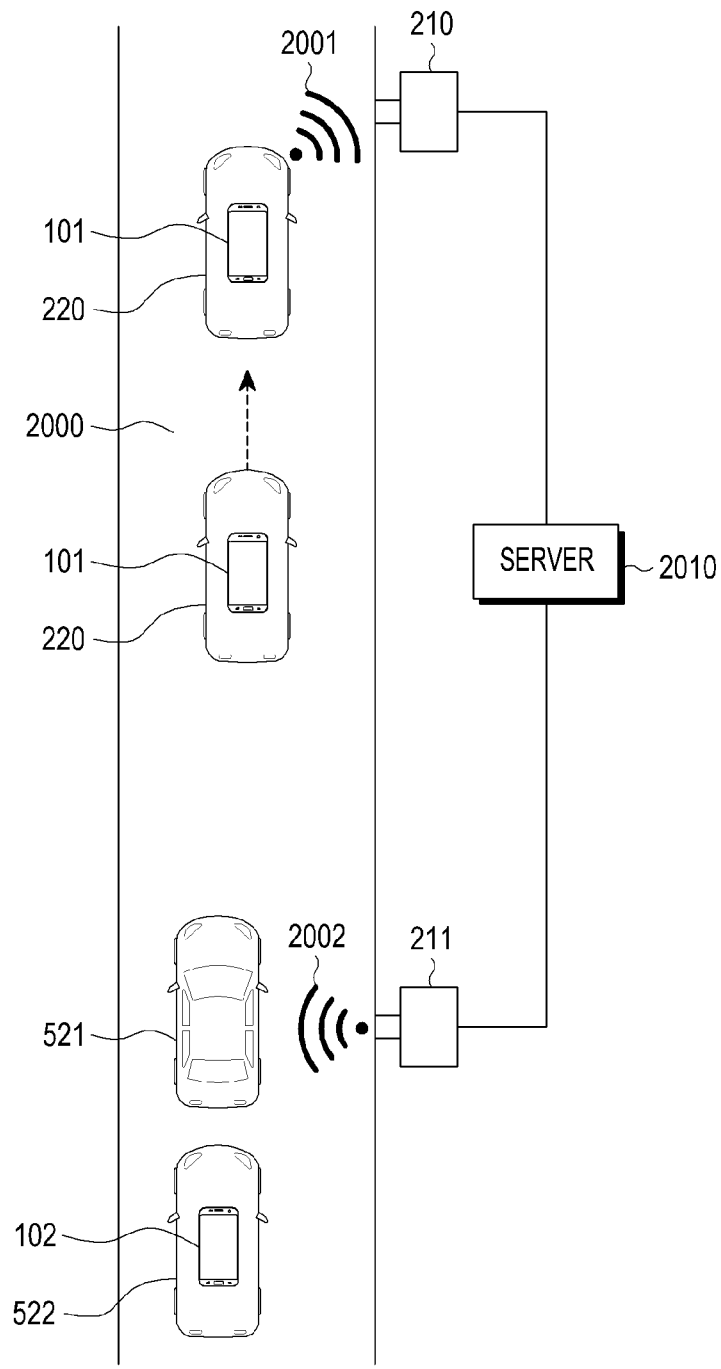
FIG. 20 illustrates a vehicle in which an electronic device is located and a roadside BS according to various embodiments of the present disclosure.

FIG. 20 illustrates a vehicle in which an electronic device is located and a roadside BS according to various embodiments of the present disclosure.

Referring to FIG. 20, the vehicle 220 may stop due to an accident or breakdown while the electronic device 101 is located inside the vehicle 220 on a road 2000. The owner (user) of the electronic device 101 may not escape from the vehicle 220. The electronic device 101 may determine that the vehicle 220 has been in an accident or broken down by receiving a communication signal from the vehicle 220. Alternatively, the electronic device 101 may determine that the vehicle 220 has been in an accident or broken down based on at least one of the speed and acceleration of the electronic device 101 or information received from another vehicle or the roadside BS, as described above. When it is determined that the location of the electronic device 101 corresponds to a dangerous area after detection of the accident, the electronic device 101 may transmit a communication signal 2001 including at least one piece of information on the location of the vehicle 220, information on the location of the electronic device 101, or movement information of the electronic device 101, for example, the PSM. The roadside BS 210 may receive the communication signal 2001 and transfer the same to a server 2010, and the server 2010 may provide information included in the communication signal 2001 to another roadside BS 211. The roadside BS 211 may transmit a communication signal 2002 including at least one piece of information on the location of the vehicle 220, information on the location of the electronic device 101, or movement information of the electronic device 101. The vehicle 521 supporting WAVE communication may identify information on the vehicle 220 having the accident by receiving the communication signal 2002. The vehicle 521 may output information on the vehicle 220 having the accident or control driving based on accident-related information. The electronic device 101 supporting WAVE communication may be located inside a vehicle 522 that does not support WAVE communication. The electronic device 102 may receive the communication signal 2002 and display received accident occurrence information on a display of the electronic device 102. Alternatively, the electronic device 102 may transmit accident-related information to the vehicle 522 through short-range communication, and the vehicle 522 may output the received accident-related information.

Figure 21:
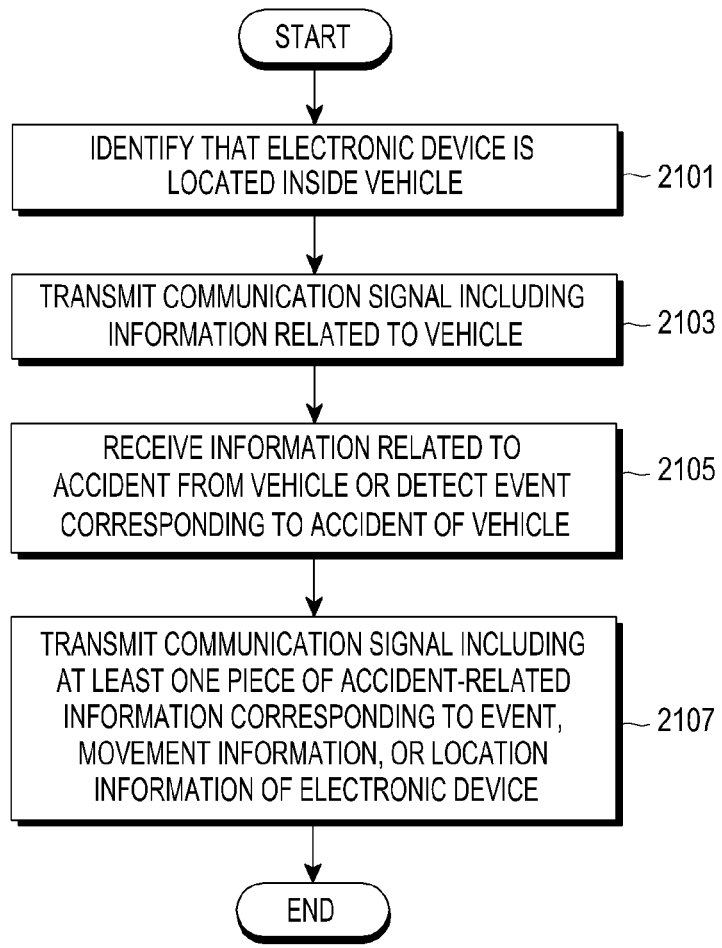
FIG. 21 is a flowchart illustrating an operation method of an electronic device according to various embodiments of the present disclosure.

FIG. 21 is a flowchart illustrating an operation method of an electronic device according to various embodiments of the present disclosure.

In operation 2101, the electronic device 101 (for example, the processor 120, the AP 311, or the sensor hub 318) according to various embodiments of the present disclosure may identify that the electronic device 101 is located inside the vehicle 220. For example, the vehicle 220 may not include a communication module for WAVE, and the electronic device 101 may identify that the vehicle 220 does not support WAVE communication. In operation 2103, the electronic device 101 may transmit a communication signal including information related to the vehicle 220, for example, a communication signal including the BSM. In operation 2105, the electronic device 101 may receive information related to the accident from the vehicle 220 or detect an event corresponding to the accident of the vehicle 220. In operation 2107, the electronic device 101 may transmit a communication signal including at least one of accident-related information corresponding to an event, movement information of the electronic device or location information of the electronic device, for example, the communication signal including the PSM. If it is determined that the current location corresponds to the dangerous area, the electronic device 101 may transmit the communication signal including the PSM. As described above, even when the electronic device 101 cannot escape from the vehicle 220, the electronic device 101 may stop transmitting the communication signal including the BSM, and may transmit the communication signal including the PSM.

According to various embodiments of the present disclosure, the electronic device 101 may include: a housing; a display (for example, the display 160) exposed through the housing; a wireless communication circuit (for example, the communication module 190) located within the housing; a processor located within the housing and connected to the display (for example, the display 160) and the wireless communication circuit (for example, the communication module 190) to be operable; and a memory (for example, the memory 130) located within the housing and connected to the processor (for example, the processor 120) to be operable, wherein the memory (for example, the memory 130) may store instructions to cause the processor (for example, the processor 120), when executed, to switch a plurality of states related to all or one of transmission/reception both of a first signal and of a second signal and transmission/reception of one thereof, the first signal may include information generated at least partially based on a state of the electronic device, the second signal may include information generated at least partially based on a state of a vehicle, and the plurality of states may include a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

According to various embodiments of the present disclosure, the first signal and the second signal may comply with the Society of Automotive Engineers (SAE) J2735 standard, wherein the first signal may include the Personal Safety Message (PSM) under the standard and the second signal may include the Basic Safety Message (BSM) under the standard.

According to various embodiments of the present disclosure, the instructions may cause the processor (for example, the processor 120) to put the electronic device in the first state when the electronic device is located outside the vehicle or when the electronic device is located inside the vehicle while receiving the second signal from the vehicle during a selected time period.

According to various embodiments of the present disclosure, the instructions may cause the processor (for example, the processor 120) to put the electronic device in the second state when the electronic device is located inside the vehicle while not receiving the second signal from the vehicle during a selected time period.

According to various embodiments of the present disclosure, the instructions may cause the processor (for example, the processor 120) to put the electronic device in the third state when the electronic device is located in a dangerous area outside the vehicle.

According to various embodiments of the present disclosure, the instructions may cause the processor (for example, the processor 120) to put the electronic device in the fourth state when the electronic device is located in a dangerous area outside the vehicle while not receiving the second signal from the vehicle during a selected time period.

According to various embodiments of the present disclosure, the instructions may cause the processor (for example, the processor 120) to switch the state from the first state to the second state, the third state, or the fourth state.

According to various embodiments of the present disclosure, the instructions may cause the processor (for example, the processor 120) to switch the state from the second state to the first state or the fourth state.

According to various embodiments of the present disclosure, the instructions may cause the processor (for example, the processor 120) to switch from the third state to the first state or the second state.

According to various embodiments of the present disclosure, the instructions may cause the processor (for example, the processor 120) to switch the state from the fourth state to the first state or the second state.

According to various embodiments of the present disclosure, the instructions may cause the processor (for example, the processor 120), when executed, to identify an accident of a vehicle after identifying that the electronic device is located inside the vehicle, identify whether location information of the electronic device corresponds to a dangerous area stored in the memory (for example, the memory 130), and when the location information of the electronic device corresponding to the dangerous area and the accident of the vehicle are identified, transmit a communication signal including at least one piece of information related to the accident, location information of the electronic device, or information related to movement of the electronic device to another vehicle or an external electronic device through the communication circuit.

According to various embodiments of the present disclosure, the instructions may cause the processor (for example, the processor 120), when executed, to identify the accident of the vehicle based on at least one piece of information selected from among information related to the accident received from the vehicle, information related to movement of the electronic device, or movement information of another vehicle received from the other vehicle or the external electronic device.

According to various embodiments of the present disclosure, a method of operating an electronic device may include: an operation of detecting a trigger of switching a plurality of states related to all or one of transmission/reception both of a first signal and of a second signal and transmission/reception of one thereof based on transmission/reception of at least one of the first signal and the second signal or reception of state information of a vehicle; and an operation of switching between the plurality of states based at least partially on the detected trigger, wherein the first signal may include information generated at least partially based on a state of the electronic device, the second signal may include information generated at least partially based on a state of the vehicle, and the plurality of states may include a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

According to various embodiments of the present disclosure, the first signal and the second signal may comply with the Society of Automotive Engineers (SAE) J2735 standard, wherein the first signal may include the Personal Safety Message (PSM) under the standard and the second signal may include the Basic Safety Message (BSM) under the standard.

According to various embodiments of the present disclosure, the operation of switching between the plurality of states may include an operation of switching to the first state when the electronic device is located outside the vehicle or when the electronic device is located inside the vehicle while receiving the second signal from the vehicle during a selected time period.

According to various embodiments of the present disclosure, the operation of switching between the plurality of states may include an operation of switching to the second state when the electronic device is located inside the vehicle while not receiving the second signal from the vehicle during a selected time period.

According to various embodiments of the present disclosure, the operation of switching between the plurality of states may include an operation of switching to the third state when the electronic device is located in a dangerous area outside the vehicle.

According to various embodiments of the present disclosure, the operation of switching between the plurality of states may include an operation of switching to the fourth state when the electronic device is located in a dangerous area outside the vehicle while not receiving the second signal from the vehicle during a selected time period.

According to various embodiments of the present disclosure, the operation of switching between the plurality of states may include an operation of switching from the first state to the second state, the third state, or the fourth state.

According to various embodiments of the present disclosure, the operation of switching between the plurality of states may include an operation of switching from the second state to the first state or the fourth state.

The electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to the embodiments disclosed herein is not limited to the above described devices.

The embodiments disclosed herein and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A and/or B", or "at least one of A, B, and/or C" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, the module may be implemented by an application-specific integrated circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments disclosed in this document may be provided while being included in a computer program product. The computer program product may be traded between a seller and a purchaser. The computer program product may be distributed in the form of a storage medium (for example, a Compact Disc Read-Only Memory (CD-ROM) or online through an application store (for example, Play Store™). In the case of online distribution, at least some of the computer program products may be at least temporarily stored in a storage medium such as a memory of a server of a manufacturer server, a server of an application store, or a relay server, or may be temporarily generated.

Each of elements (for example, a module or a program) according to various embodiments may be configured as a single entity or a plurality thereof, and some of the corresponding sub elements may be omitted, or other sub elements may be further included in various embodiments. Alternatively or additionally, some elements (for example, a module or a program) may be integrated into one entity and equally or similarly perform a function executed by each of the corresponding elements before they are integrated. Operations performed by a module, a program, or other elements according to various embodiments may be executed sequentially, in parallel, repeatedly, or in a heuristic manner. At least some operations may be executed according to another sequence, may be omitted, or may further include other operations.

According to various embodiments of the present disclosure, a storage medium storing instructions is provided. The instructions may be configured to, when executed by at least one processor, cause the at least one processor to perform at least one operation. The at least one operation may include an operation of detecting a trigger of switching a plurality of states related to all or one of transmission/reception of both a first signal and a second signal and transmission/reception of one thereof based on transmission/reception of at least one of the first signal and the second signal or reception of state information of a vehicle, and an operation of switching between the plurality of states based at least partially on the detected trigger.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a display exposed through the housing;
   a wireless communication circuit located within the housing;
   a processor located within the housing and operably connected to the display and the wireless communication circuit; and
   a memory located within the housing and operably connected to the processor,
   wherein:
   the memory stores instructions that, when executed by the processor, cause the processor to switch among a plurality of states related to at least one of (i) transmission or reception of a first signal or (ii) transmission or reception of a second signal,
   the first signal comprises information generated at least partially based on a state of the electronic device,
   the second signal comprises information generated at least partially based on a state of a vehicle, and
   the plurality of states comprises a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

2. The electronic device of claim 1, wherein:
   the first signal and the second signal comply with a Society of Automotive Engineers (SAE) J2735 standard,
   the first signal comprises a Personal Safety Message (PSM) under the standard, and
   the second signal comprises a Basic Safety Message (BSM) under the standard.

3. The electronic device of claim 1, wherein the instructions, when executed by the processor, cause the processor to put the electronic device in the first state (i) when the electronic device is located outside the vehicle or (ii) when the electronic device is located inside the vehicle while receiving the second signal from the vehicle during a selected time period.

4. The electronic device of claim 1, wherein the instructions, when executed by the processor, cause the processor to put the electronic device in the second state when the electronic device is located inside the vehicle while not receiving the second signal from the vehicle during a selected time period.

5. The electronic device of claim 1, wherein the instructions, when executed by the processor, cause the processor to put the electronic device in the third state when the electronic device is located in a dangerous area outside the vehicle.

6. The electronic device of claim 1, wherein the instructions, when executed by the processor, cause the processor to put the electronic device in the fourth state when the electronic device is located in a dangerous area outside the vehicle while not receiving the second signal from the vehicle during a selected time period.

7. The electronic device of claim 1, wherein the instructions, when executed by the processor, cause the processor to switch the state from the first state to the second state, the third state, or the fourth state.

8. The electronic device of claim 7, wherein the instructions, when executed by the processor, cause the processor to switch the state from the second state to the first state or the fourth state.

9. The electronic device of claim 8, wherein the instructions, when executed by the processor, cause the processor to switch from the third state to the first state or the second state.

10. The electronic device of claim 9, wherein the instructions, when executed by the processor, cause the processor to switch the state from the fourth state to the first state or the second state.

11. A method of operating an electronic device, the method comprising:
  detecting a trigger of switching among a plurality of states related to at least one of (i) transmission or reception of a first signal or (ii) transmission or reception of a second signal based on (i) transmission or reception of at least one of the first signal or the second signal or (ii) reception of state information of a vehicle; and
  switching among the plurality of states based at least partially on the detected trigger,
  wherein the first signal comprises information generated at least partially based on a state of the electronic device,
  the second signal comprises information generated at least partially based on a state of the vehicle, and
  the plurality of states comprises a first state, in which the electronic device receives the first signal and the second signal, a second state, in which the electronic device transmits and receives the second signal, a third state, in which the electronic device transmits the first signal and receives the second signal, and a fourth state, in which the electronic device transmits and receives the first signal and the second signal.

12. The method of claim 11, wherein:
  the first signal and the second signal comply with a Society of Automotive Engineers (SAE) J2735 standard,
  the first signal comprises a Personal Safety Message (PSM) under the standard, and
  the second signal comprises a Basic Safety Message (BSM) under the standard.

13. The method of claim 11, wherein the switching among the plurality of states comprises switching to the first state (i) when the electronic device is located outside the vehicle or (ii) when the electronic device is located inside the vehicle while receiving the second signal from the vehicle during a selected time period.

14. The method of claim 11, wherein the switching among the plurality of states comprises switching to the second state when the electronic device is located inside the vehicle while not receiving the second signal from the vehicle during a selected time period.

15. The method of claim 11, wherein the switching between the plurality of states comprises switching to the third state when the electronic device is located in a dangerous area outside the vehicle.

16. The method of claim 11, wherein the switching between the plurality of states comprises switching to the fourth state when the electronic device is located in a dangerous area outside the vehicle while not receiving the second signal from the vehicle during a selected time period.

17. The method of claim 11, wherein the switching between the plurality of states comprises switching from the first state to the second state, the third state, or the fourth state.

18. The method of claim 17, wherein the switching between the plurality of states comprises switching from the second state to the first state or the fourth state.

19. An electronic device comprising:
  a housing;
  a display;
  a wireless communication circuit located within the housing;
  a processor located within the housing and operably connected to the display and the wireless communication circuit; and
  a memory located within the housing and operably connected to the processor,
  wherein the memory stores instructions that, when executed by the processor, cause the processor to:
    identify an accident of a vehicle after identifying that the electronic device is located inside the vehicle,
    identify whether first location information of the electronic device corresponds to a dangerous area stored in the memory, and
    when the first location information of the electronic device corresponding to the dangerous area and the accident of the vehicle are identified, transmit, via the wireless communication circuit, a communication signal including information related to the accident, second location information of the electronic device, and information related to movement of the electronic device to another vehicle or an external electronic device after identifying that the electronic device is located outside the vehicle.

20. The electronic device of claim 19, wherein the instructions, when executed by the processor, cause the processor to identify the accident of the vehicle based on at least one of the information related to the accident received from the vehicle, or movement information of the other vehicle received from the other vehicle or the external electronic device.

* * * * *